United States Patent
Le et al.

(10) Patent No.: US 9,406,320 B2
(45) Date of Patent: Aug. 2, 2016

(54) SCISSOR UNIDIRECTIONAL BIASING WITH HARD BIAS STABILIZED SOFT BIAS

(71) Applicant: HGST Netherlands B.V., Amsterdam (NL)

(72) Inventors: Quang Le, San Jose, CA (US); David J. Seagle, Morgan Hill, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/464,418

(22) Filed: Aug. 20, 2014

(65) Prior Publication Data

US 2016/0055866 A1    Feb. 25, 2016

(51) Int. Cl.
G11B 5/39    (2006.01)

(52) U.S. Cl.
CPC ............... *G11B 5/39* (2013.01); *G11B 5/3932* (2013.01); *G11B 2005/3996* (2013.01)

(58) Field of Classification Search
CPC ...... G11B 5/39; G11B 5/3906; G11B 5/3912; G11B 5/3932; G11B 5/3945; G11B 5/3948; G11B 5/3941; G11B 5/3954; G11B 5/398
USPC .................................... 360/319, 324–324.2
See application file for complete search history.

(56) References Cited

U.S. PATENT DOCUMENTS

| | | | |
|---|---|---|---|
| 5,576,914 A | 11/1996 | Rottmayer et al. | |
| 8,018,691 B2 | 9/2011 | Gill et al. | |
| 8,144,437 B2 | 3/2012 | Miyauchi et al. | |
| 9,153,258 B2 * | 10/2015 | Le | G11B 5/3906 |
| 2009/0154025 A1 * | 6/2009 | Carey | B82Y 10/00 360/314 |
| 2011/0007426 A1 | 1/2011 | Qiu et al. | |
| 2011/0026169 A1 | 2/2011 | Gill et al. | |
| 2013/0027031 A1 * | 1/2013 | Dimitrov | G01R 33/098 324/252 |
| 2013/0082696 A1 | 4/2013 | Le et al. | |
| 2014/0022668 A1 * | 1/2014 | Takagishi | G11B 5/11 360/97.11 |
| 2015/0154991 A1 * | 6/2015 | Le | G11B 5/3906 360/97.11 |

FOREIGN PATENT DOCUMENTS

JP          2013080536 A   *   5/2013

OTHER PUBLICATIONS

Zhu, J. "New Heights for Hard Disk Drives," Materials Today, Jul./Aug. 2003, pp. 22-30.

* cited by examiner

*Primary Examiner* — Will J Klimowicz
(74) *Attorney, Agent, or Firm* — Zilka-Kotab, PC

(57) ABSTRACT

In one embodiment, an apparatus includes a scissor sensor stack, a soft bias layer positioned behind the scissor sensor stack in an element height direction, the soft bias layer including a soft magnetic material, and a hard bias layer, at least a portion thereof being positioned behind the soft bias layer in the element height direction, the hard bias layer including a hard magnetic material having an initialization magnetization that is perpendicular to a media-facing surface of the apparatus to provide unidirectional anisotropy to the soft bias layer, wherein the scissor sensor stack includes a first free layer, a second free layer positioned above the first free layer, and a barrier layer positioned between the first free layer and the second free layer. Other apparatuses and methods for forming such apparatuses are described in more embodiments.

20 Claims, 24 Drawing Sheets

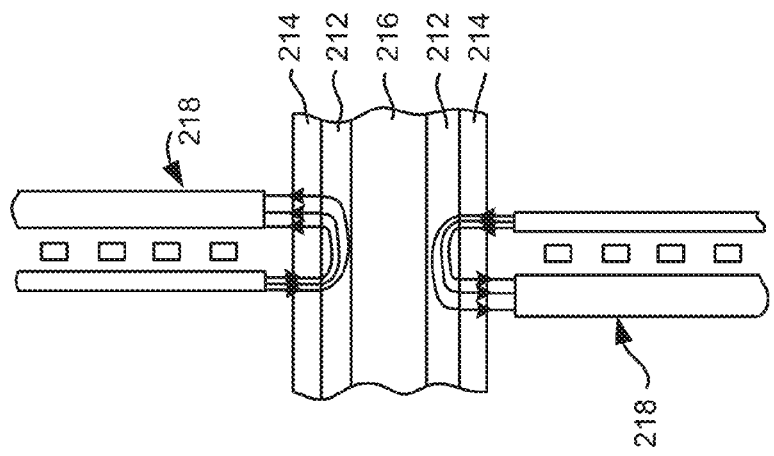
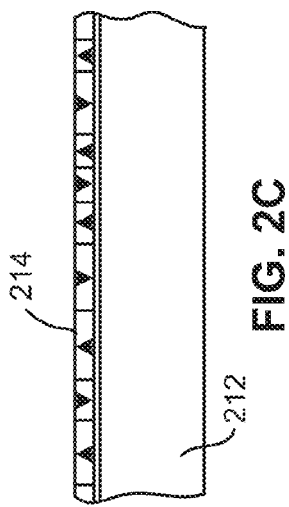
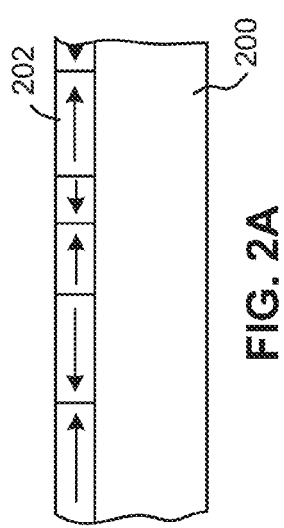
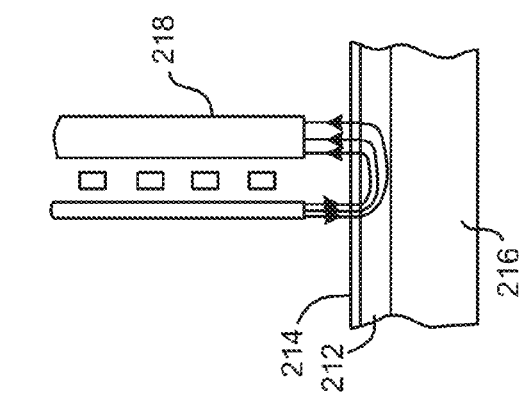
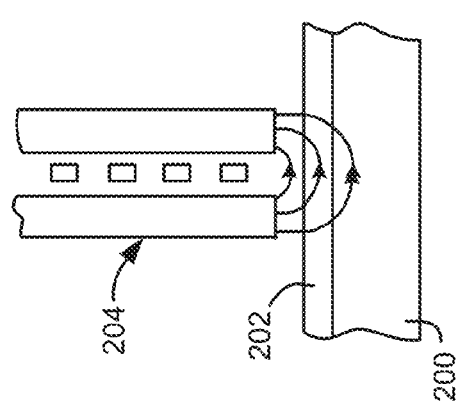

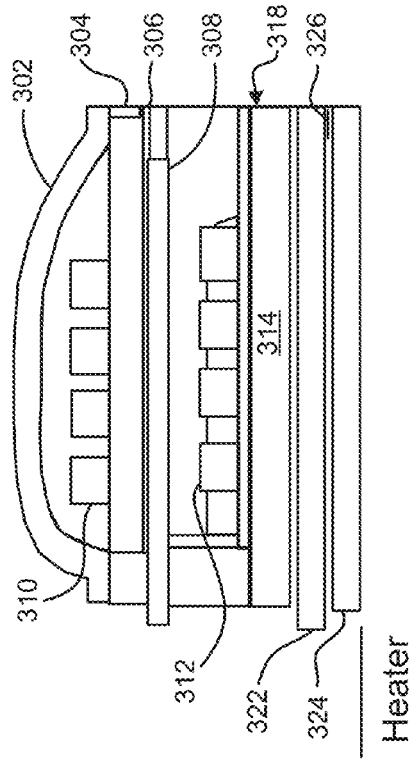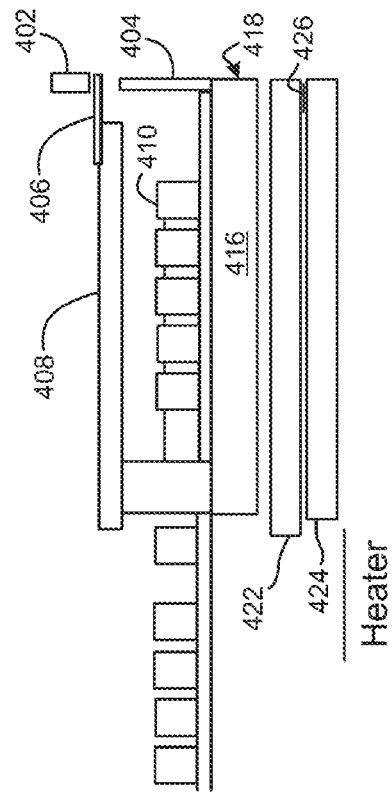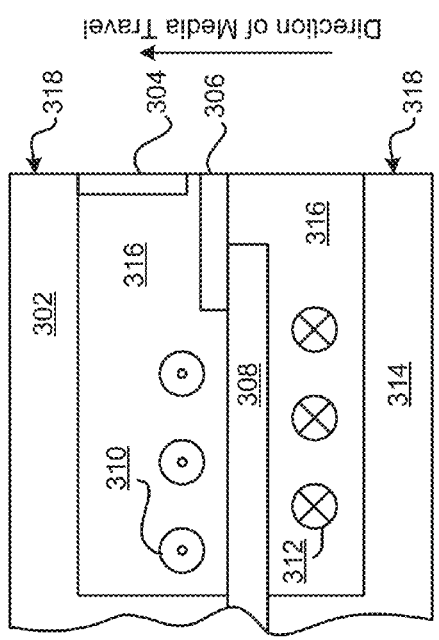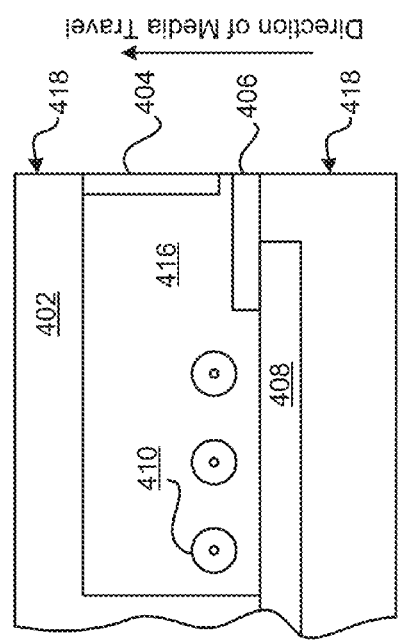

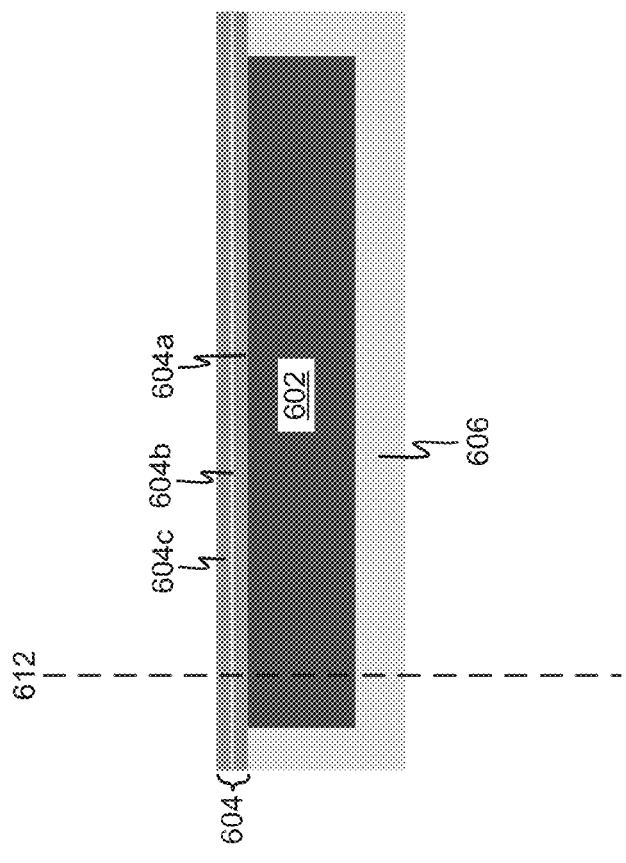
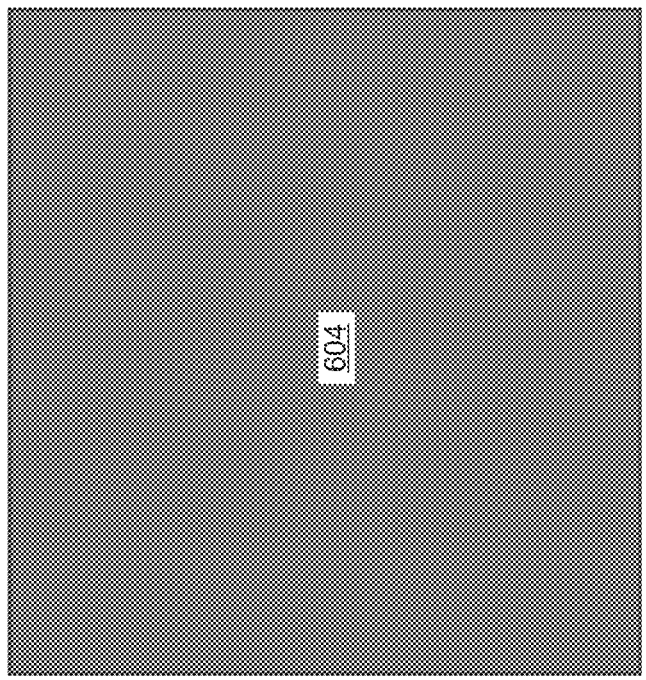
FIG. 6A

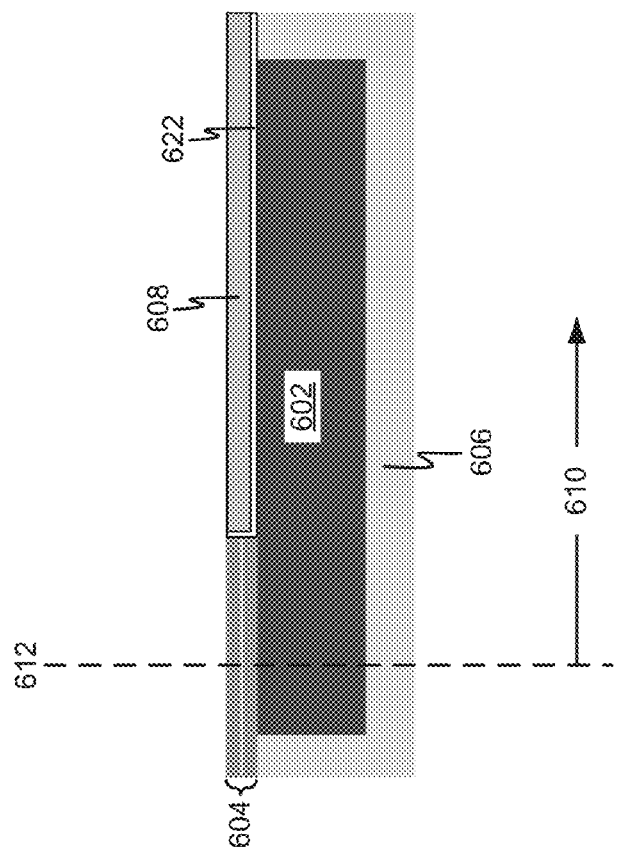
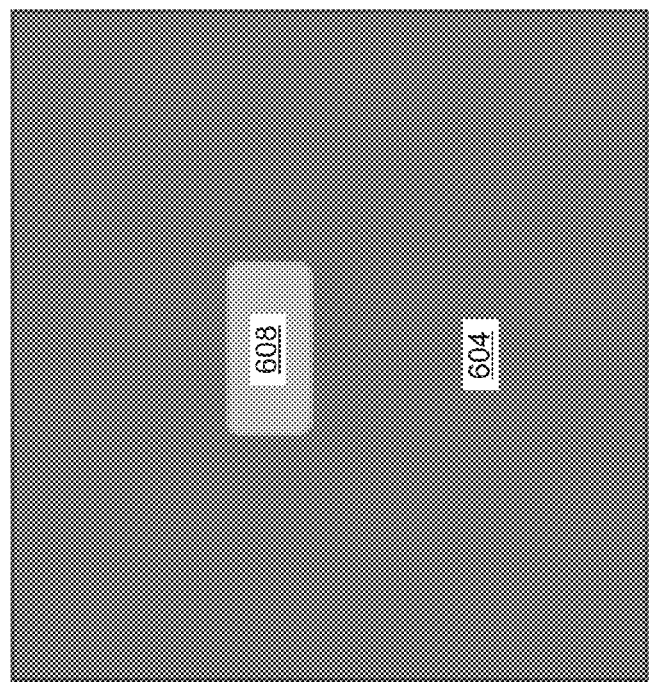
FIG. 6B

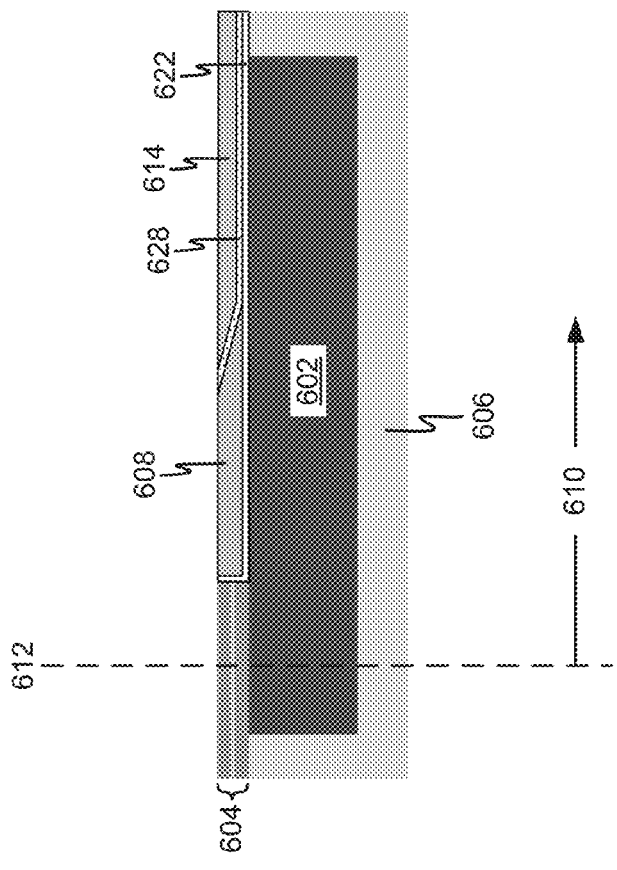
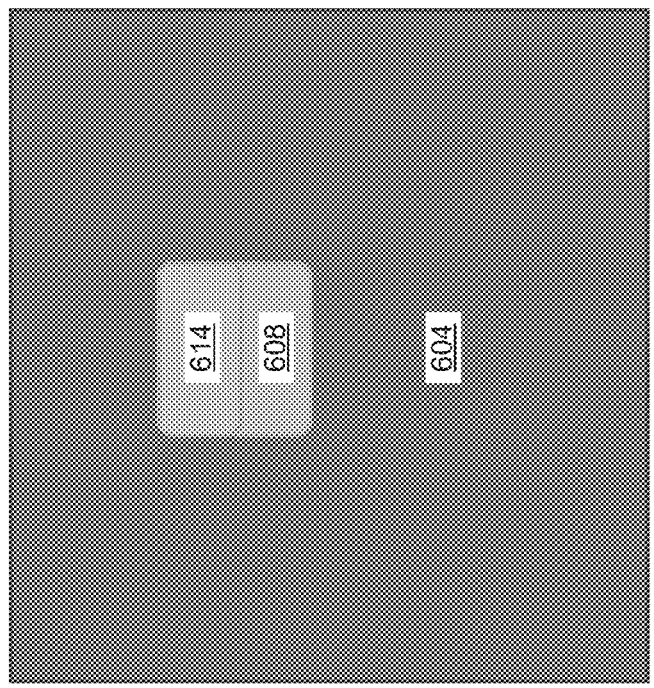
FIG. 6C

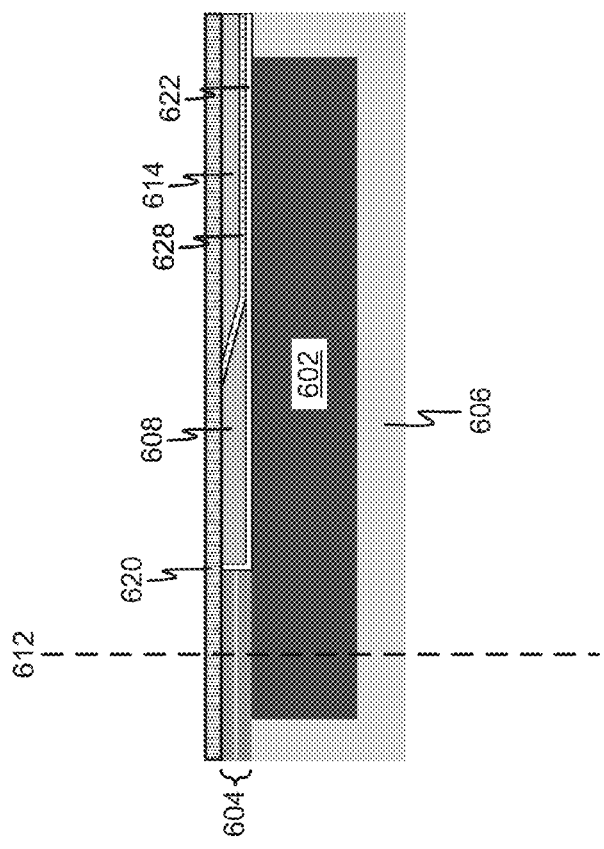
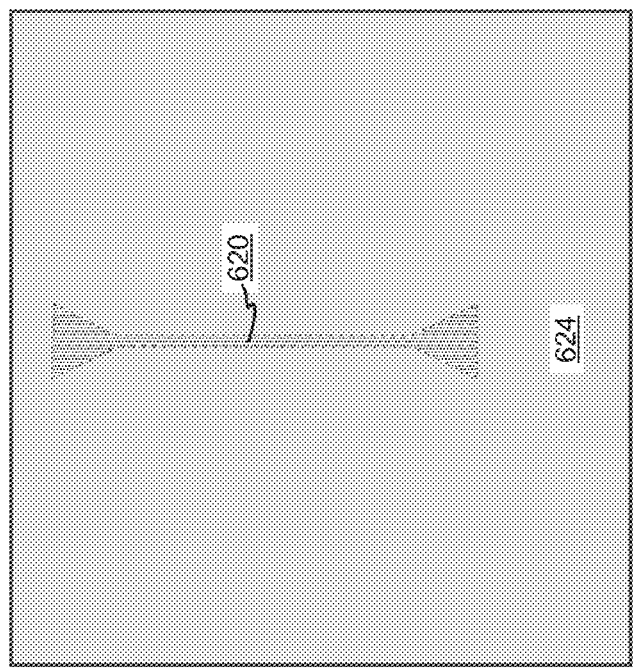
FIG. 6D

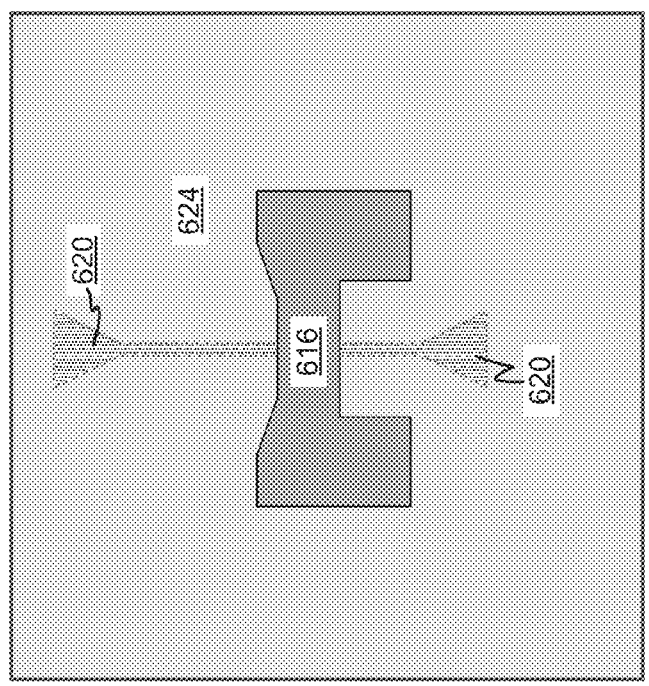
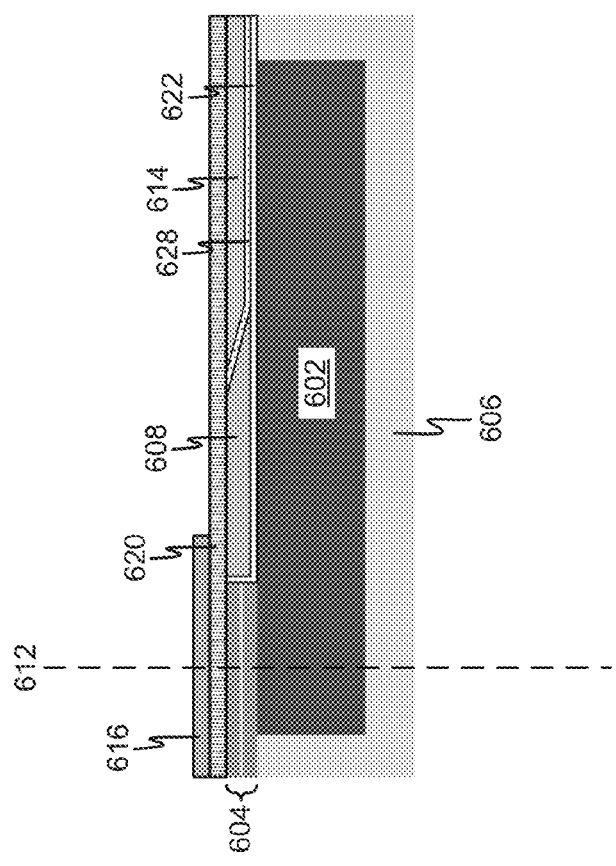
FIG. 6E

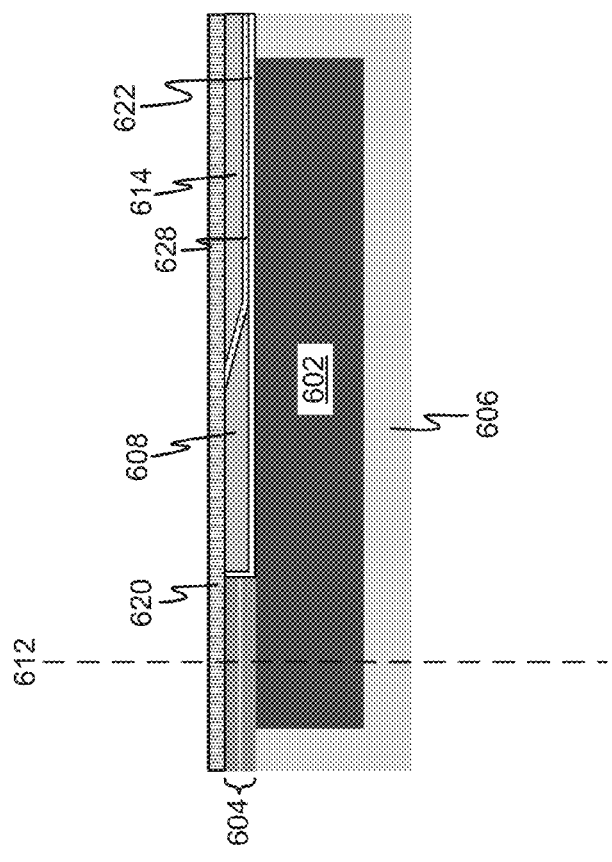
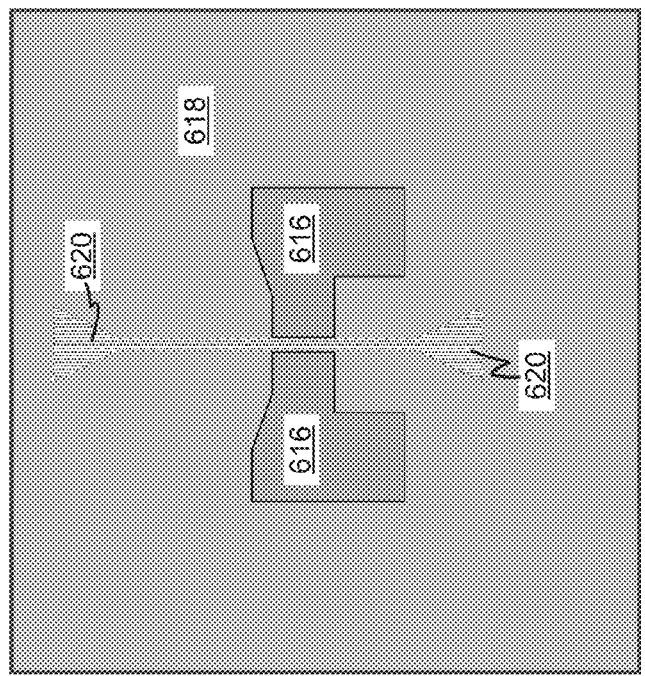
FIG. 6F

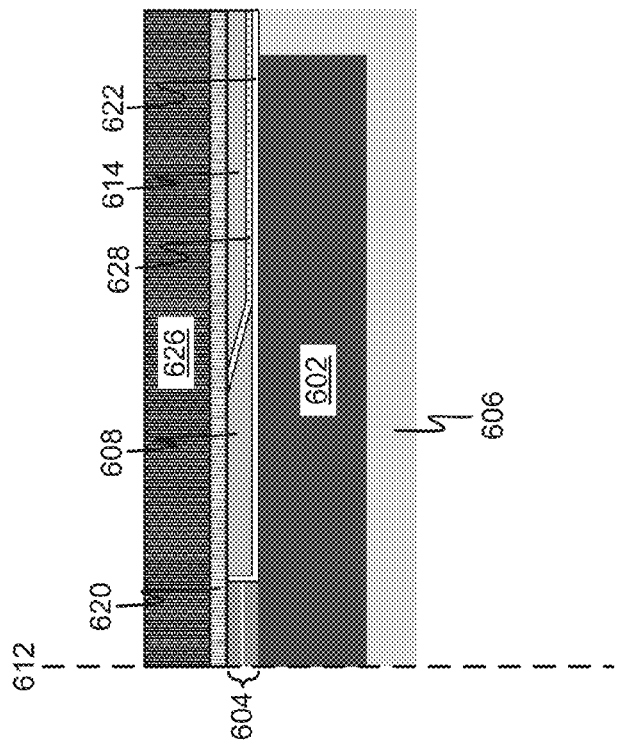
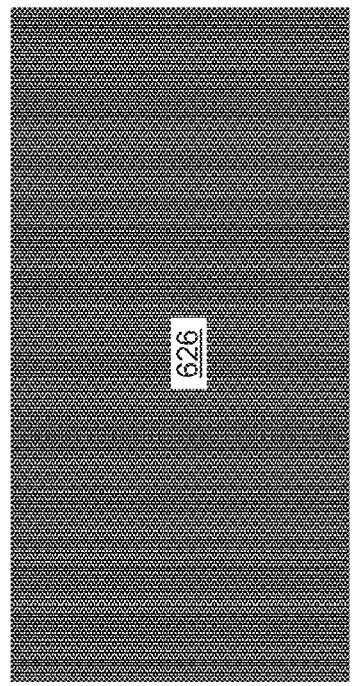
FIG. 6G

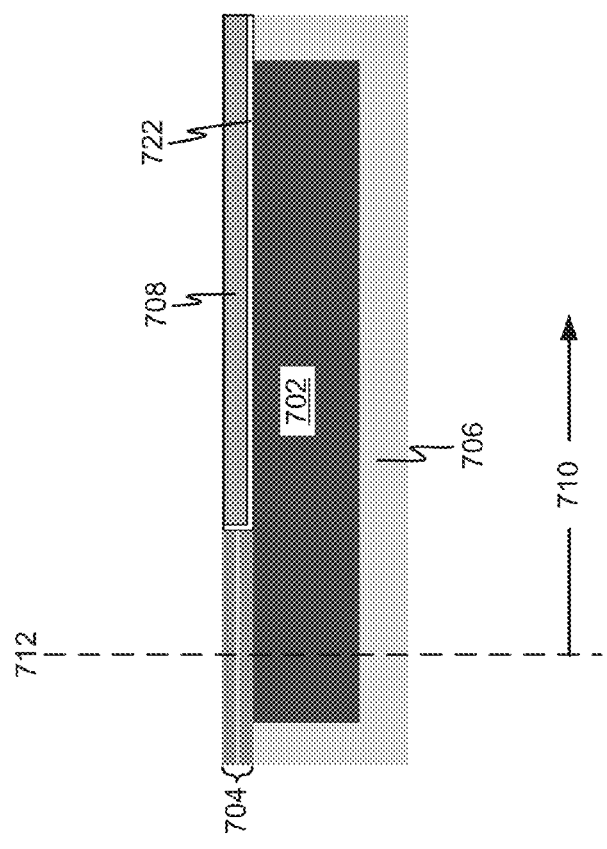
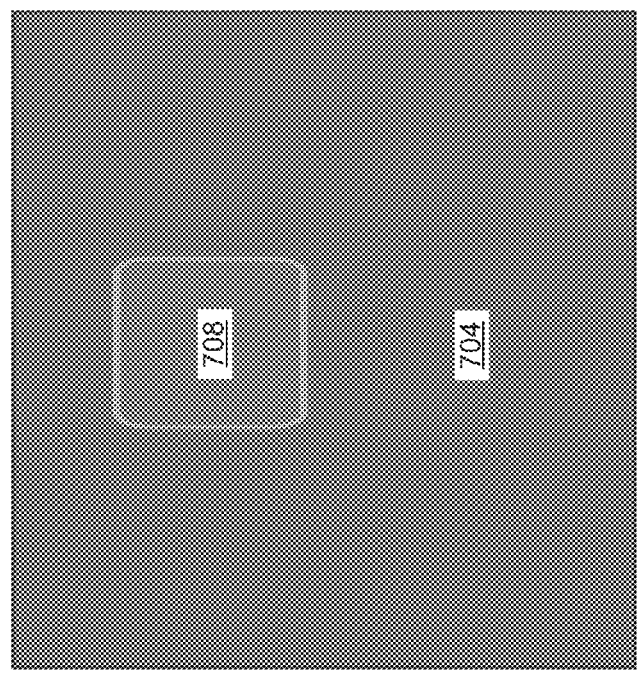
FIG. 7A

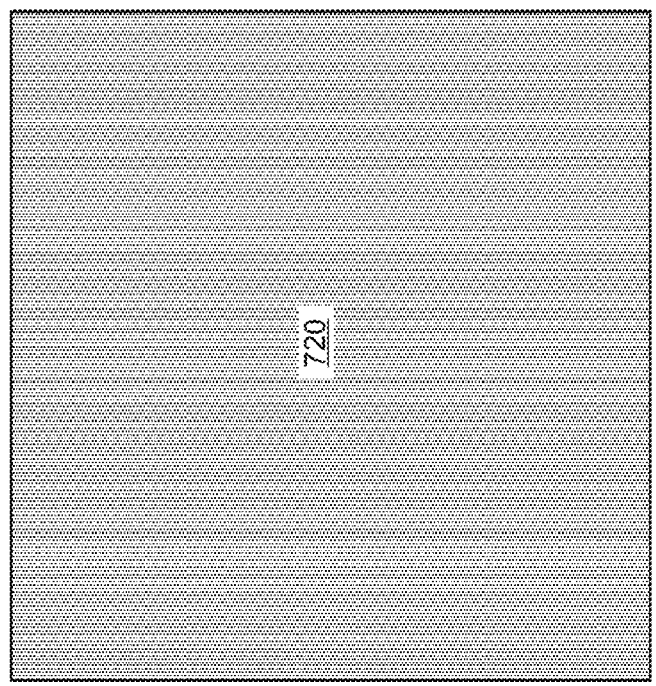
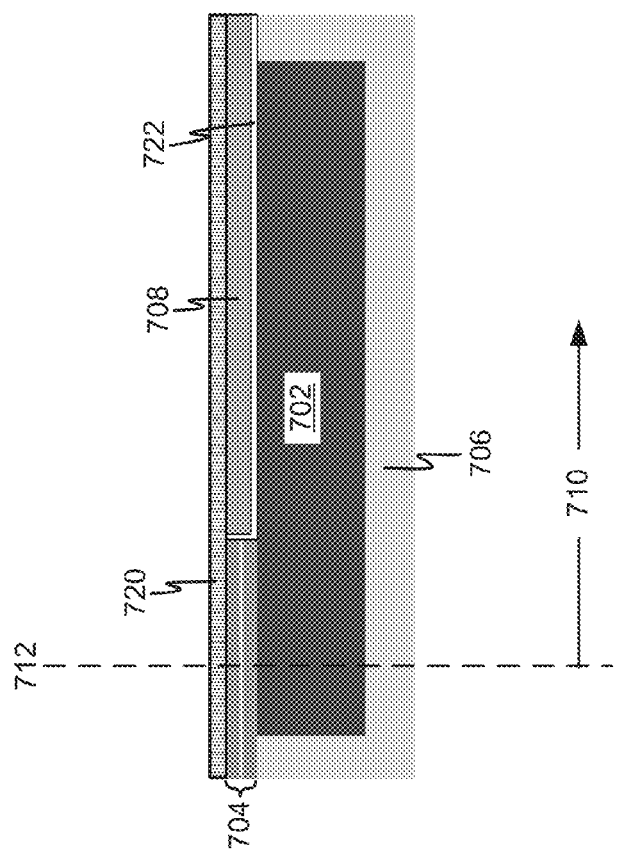
FIG. 7B

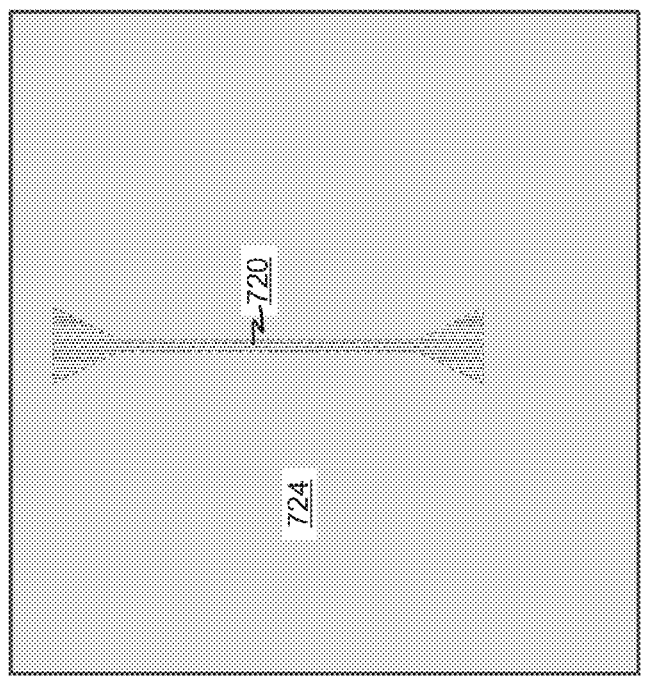
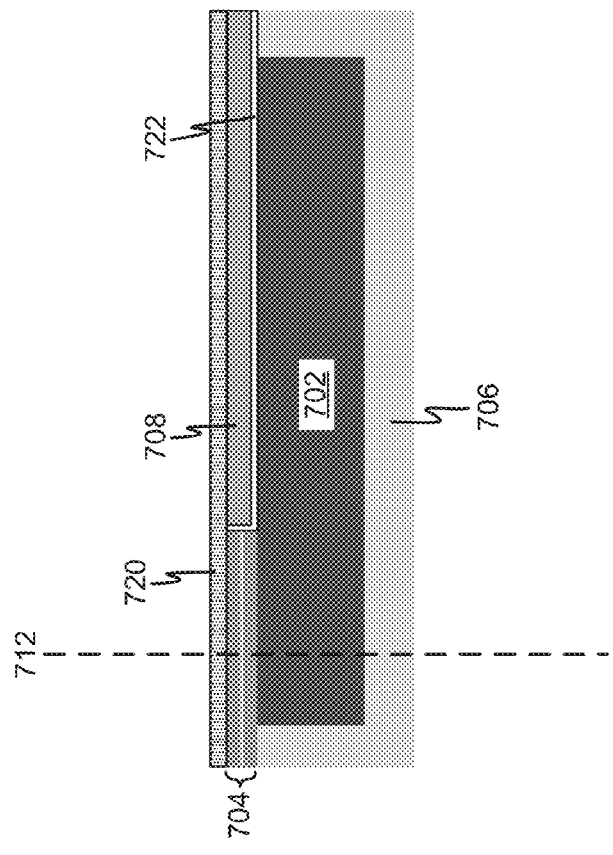
FIG. 7C

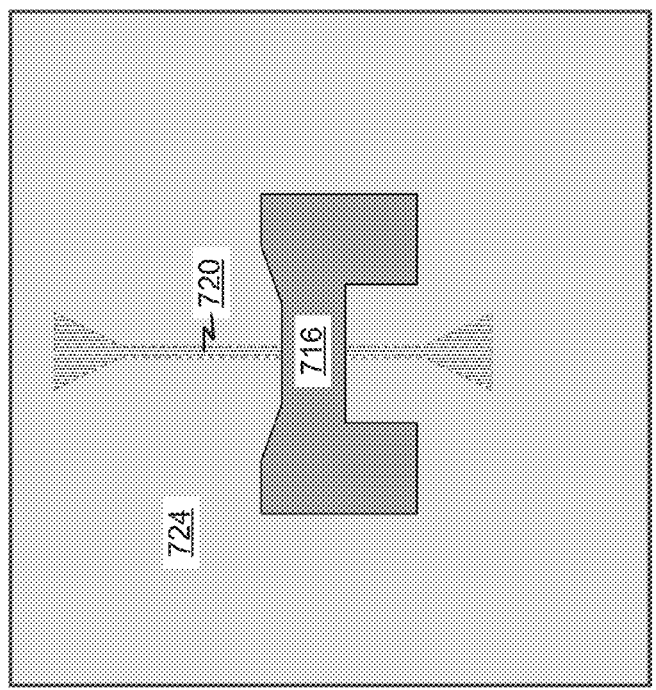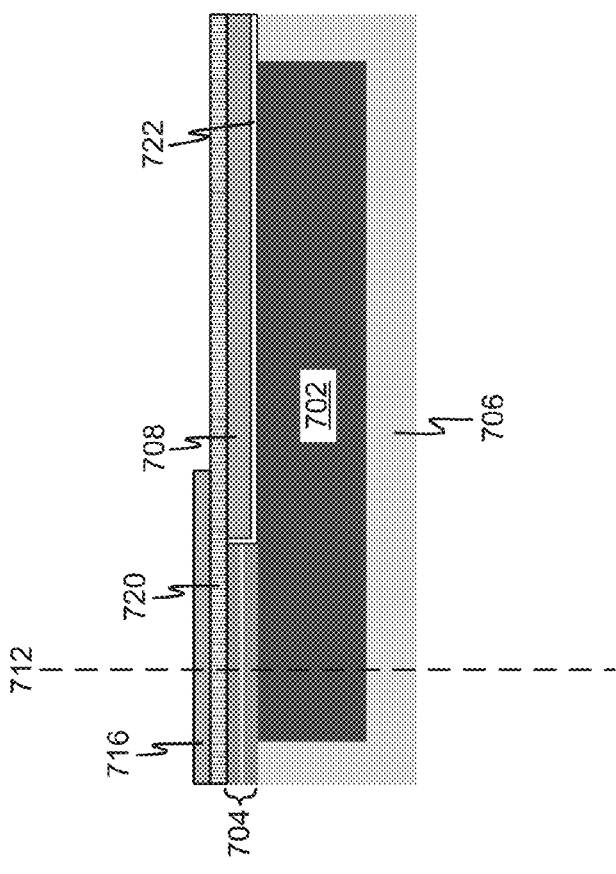
FIG. 7D

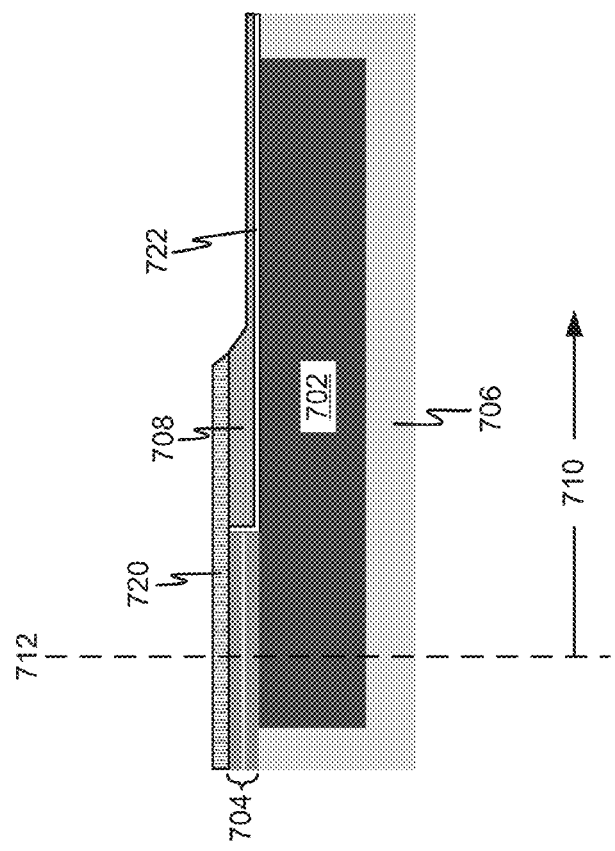
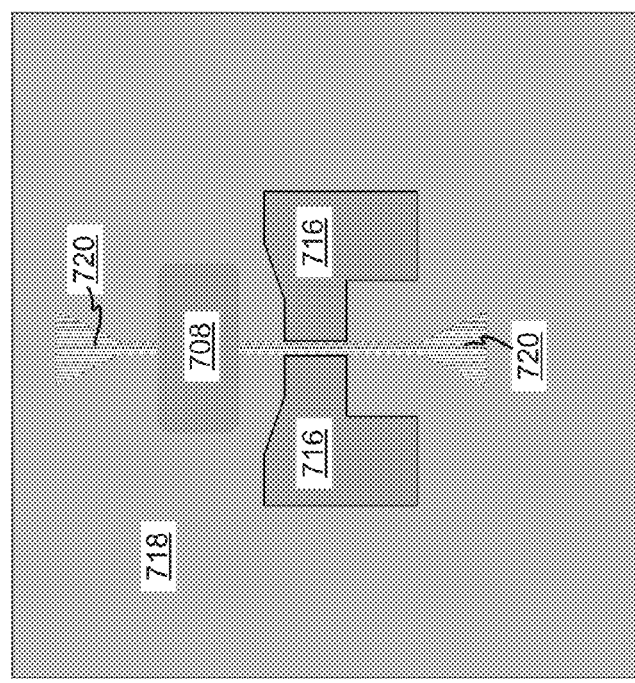
FIG. 7E

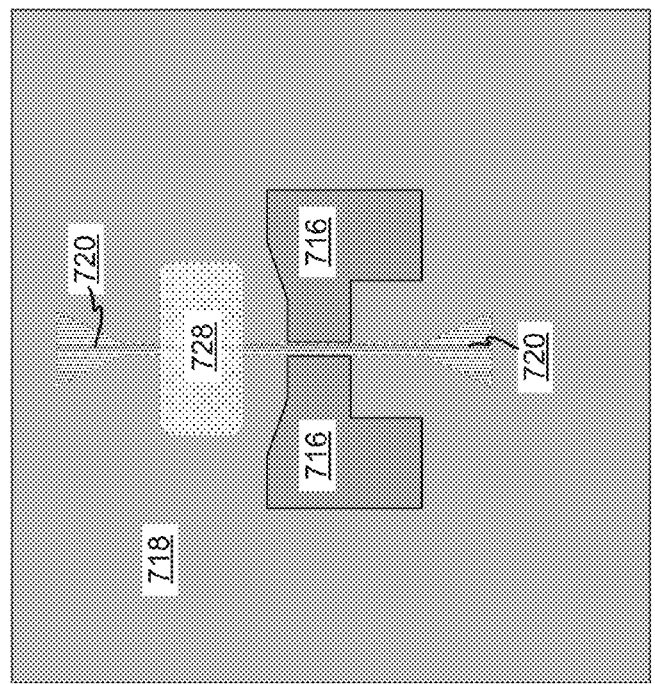
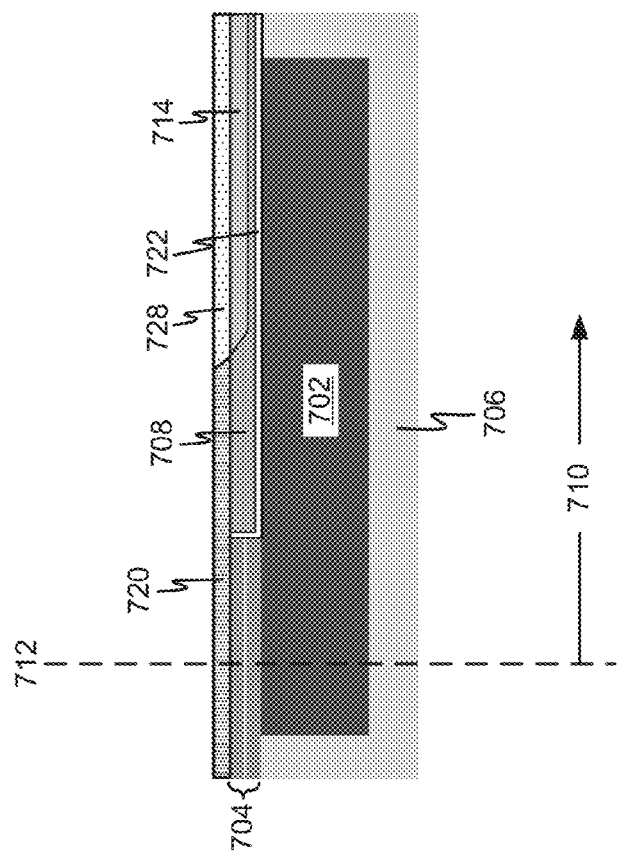
FIG. 7F

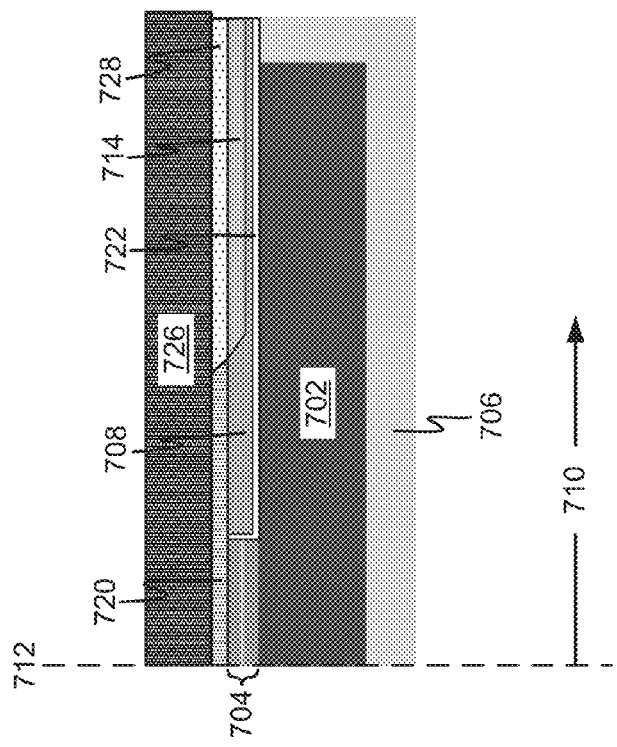
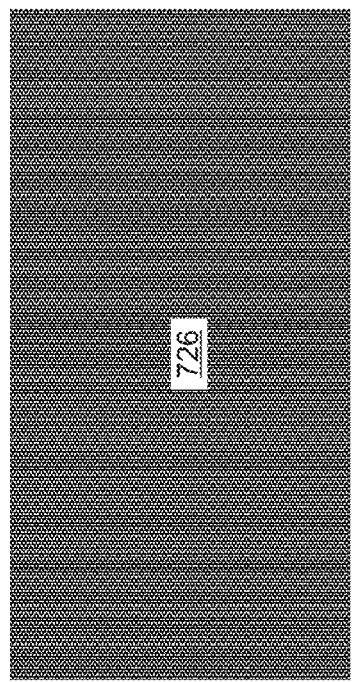
FIG. 7G

US 9,406,320 B2

SCISSOR UNIDIRECTIONAL BIASING WITH HARD BIAS STABILIZED SOFT BIAS

FIELD OF THE INVENTION

The present invention relates to magnetic data storage devices, and more particularly, this invention relates to a magnetic data storage device that utilizes a scissor sensor which features unidirectional biasing from a hard bias layer stabilized soft bias layer.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, it is desired that HDDs be able to store more information in their limited area and volume. A technical approach to this desire is to increase the capacity by increasing the recording density of the HDD. To achieve higher recording density, further miniaturization of recording bits is effective, which in turn typically requires the design of smaller and smaller components.

The further miniaturization of the various components, however, presents its own set of challenges and obstacles. As a real density increases the read/write transducers need to be smaller and closer together, which results in cross-talk, interference, and/or degradation of performance of the various components, such as sensors, within the magnetic heads.

SUMMARY

In one embodiment, an apparatus includes a scissor sensor stack, a soft bias layer positioned behind the scissor sensor stack in an element height direction, the soft bias layer including a soft magnetic material, and a hard bias layer, at least a portion thereof being positioned behind the soft bias layer in the element height direction, the hard bias layer including a hard magnetic material having an initialization magnetization that is perpendicular to a media-facing surface of the apparatus to provide unidirectional anisotropy to the soft bias layer, wherein the scissor sensor stack includes a first free layer, a second free layer positioned above the first free layer, and a barrier layer positioned between the first free layer and the second free layer.

In another embodiment, a method for forming a sensor includes forming a first free layer, forming a barrier layer above the first free layer, forming a second free layer above the barrier layer, wherein the first free layer, the barrier layer, and the second free layer together form a scissor sensor stack, forming a soft bias layer behind the scissor sensor stack in an element height direction, the soft bias layer including a soft magnetic material, and forming a hard bias layer, at least a portion thereof being positioned behind the soft bias layer in the element height direction, the hard bias layer including a hard magnetic material having an initialization magnetization that is perpendicular to a media-facing surface of the sensor to provide unidirectional anisotropy to the soft bias layer.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

FIGS. 6A-6G show a formation process for forming a scissor sensor stack according to one embodiment.

FIGS. 7A-7G show a formation process for forming a scissor sensor stack according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, an apparatus includes a scissor sensor stack, a soft bias layer positioned behind the scissor sensor stack in an element height direction, the soft bias layer including a soft magnetic material, and a hard bias layer, at least a portion thereof being positioned behind the soft bias layer in the element height direction, the hard bias layer including a hard magnetic material having an initialization magnetization that is perpendicular to a media-facing surface of the apparatus to provide unidirectional anisotropy to the soft bias layer, wherein the scissor sensor stack includes a first free layer, a second free layer positioned above the first free layer, and a barrier layer positioned between the first free layer and the second free layer.

In another general embodiment, a method for forming a sensor includes forming a first free layer, forming a barrier layer above the first free layer, forming a second free layer above the barrier layer, wherein the first free layer, the barrier layer, and the second free layer together form a scissor sensor stack, forming a soft bias layer behind the scissor sensor stack in an element height direction, the soft bias layer including a soft magnetic material, and forming a hard bias layer, at least a portion thereof being positioned behind the soft bias layer in the element height direction, the hard bias layer including a hard magnetic material having an initialization magnetization that is perpendicular to a media-facing surface of the sensor to provide unidirectional anisotropy to the soft bias layer.

Figure 1:
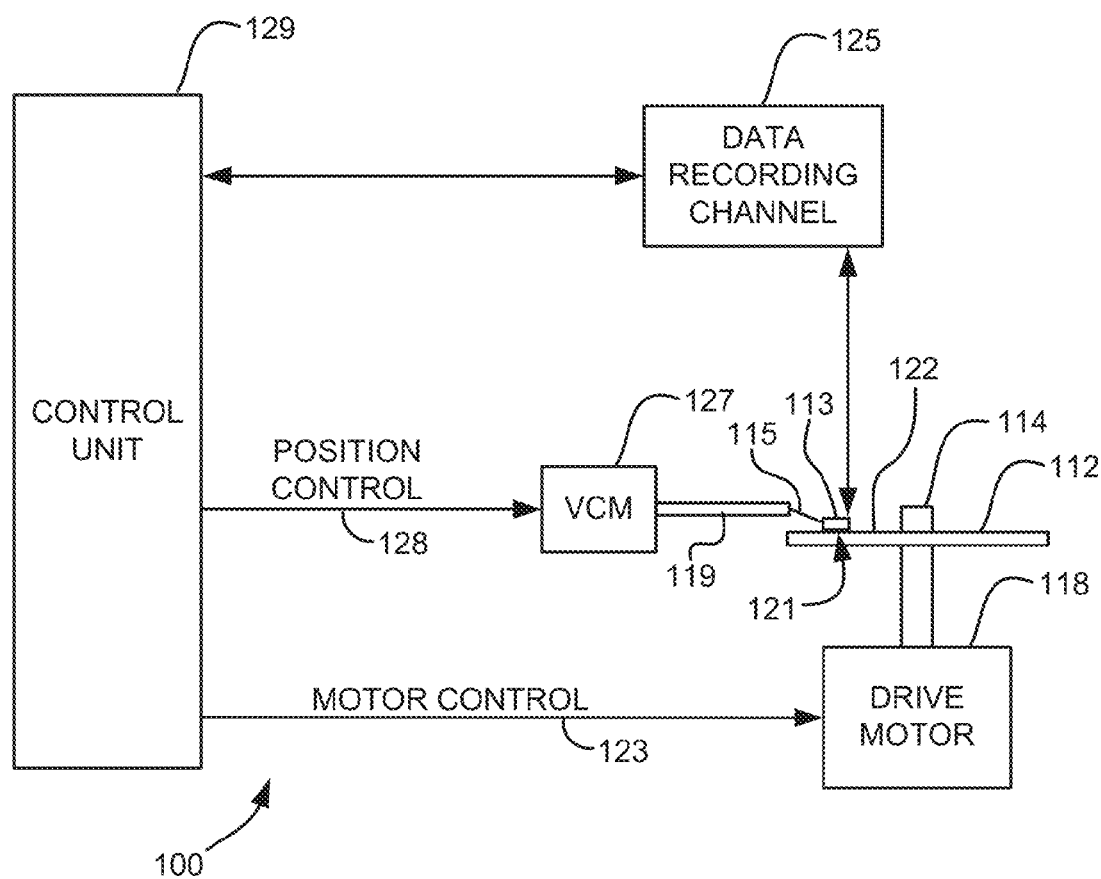
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic medium (e.g., magnetic disk) 112 is supported on a spindle 114 and rotated by a drive mechanism, which may include a disk drive motor 118. The magnetic recording on each disk is typically in the form of an annular pattern of concentric data tracks (not shown) on the disk 112. Thus, the disk drive motor 118 preferably passes the magnetic disk 112 over the magnetic read/write portions 121, described immediately below.

At least one slider 113 is positioned near the disk 112, each slider 113 supporting one or more magnetic read/write portions 121, e.g., of a magnetic head according to any of the approaches described and/or suggested herein. As the disk rotates, slider 113 is moved radially in and out over disk surface 122 so that portions 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. In a preferred approach, the control unit 129 is electrically coupled (e.g., via wire, cable, line, etc.) to the one or more magnetic read/write portions 121, for controlling operation thereof. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write portions 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write portion includes a coil layer embedded in one or more insulation layers (insulation stack), the insulation stack being located between first and second pole piece layers. A gap is formed between the first and second pole piece layers of the write portion by a gap layer at or near a media facing surface of the head (sometimes referred to as an ABS in a disk drive). The pole piece layers may be connected at a back gap. Currents are conducted through the coil layer, which produce magnetic fields in the pole pieces. The magnetic fields fringe across the gap at the media facing surface for the purpose of writing bits of magnetic field information in tracks on moving media, such as in circular tracks on a rotating magnetic disk.

The second pole piece layer has a pole tip portion which extends from the media facing surface to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft under layer 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the media facing surface 318. Insulation 316 surrounds the coils and may provide support for some of the elements. The direction of the media travel, as indicated by the arrow to the right of the structure, moves the media past the leading shield 314 first, then past the stitch pole 308, main pole 306, trailing shield 304 which may be connected to the wrap around shield (not shown), and finally past the upper return pole 302. Each of these components may have a portion in contact with the media facing surface 318. The media facing surface 318 is indicated across the right side of the structure.

Perpendicular writing is achieved by forcing flux through the stitch pole 308 into the main pole 306 and then to the surface of the disk positioned towards the media facing surface 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the media facing surface 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the media facing surface 418). The media facing surface 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown away from the media facing surface of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Except as otherwise described herein, the various components of the structures of FIGS. 3A-4B may be of conventional materials and design, as would understood by one skilled in the art.

Figure 5A:
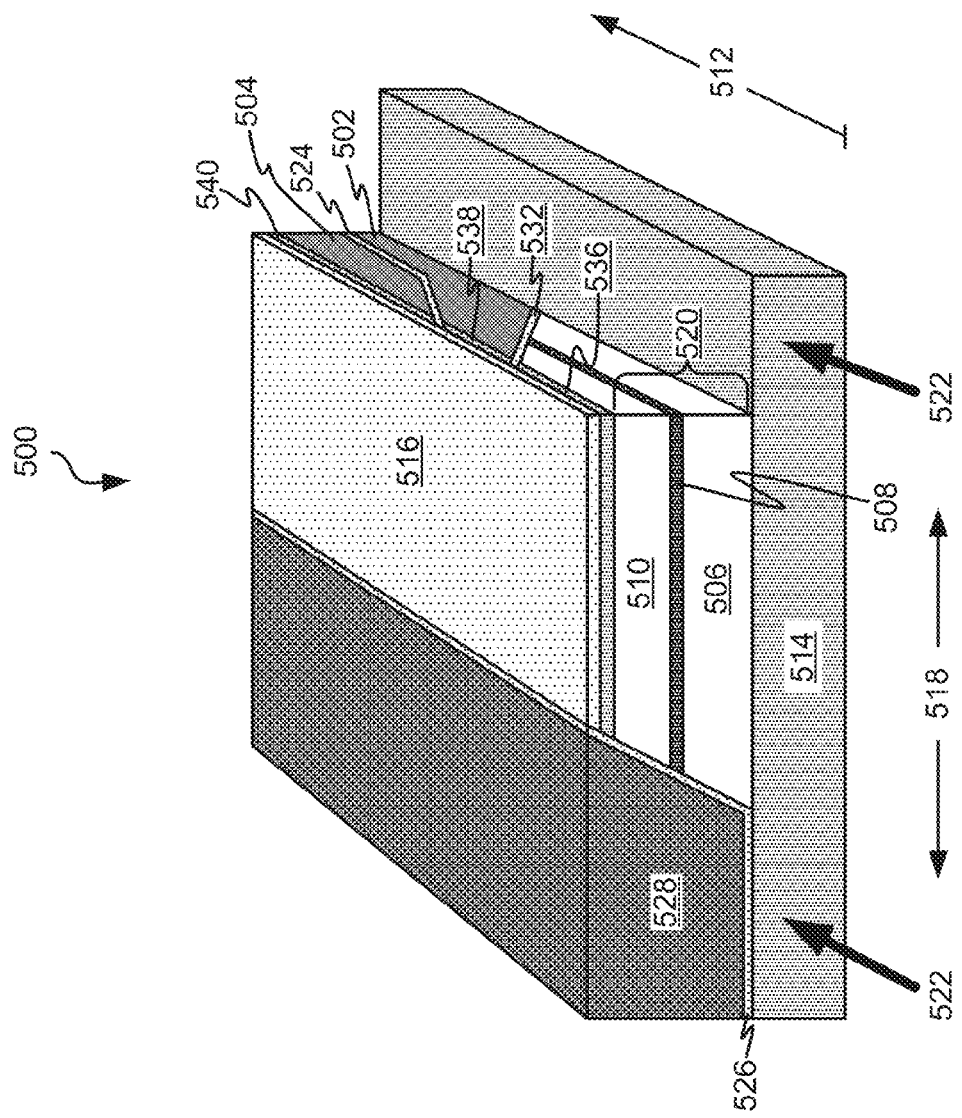
FIGS. 5A-5D show isometric views of scissor sensors, according to several embodiments.
Figure 5B:
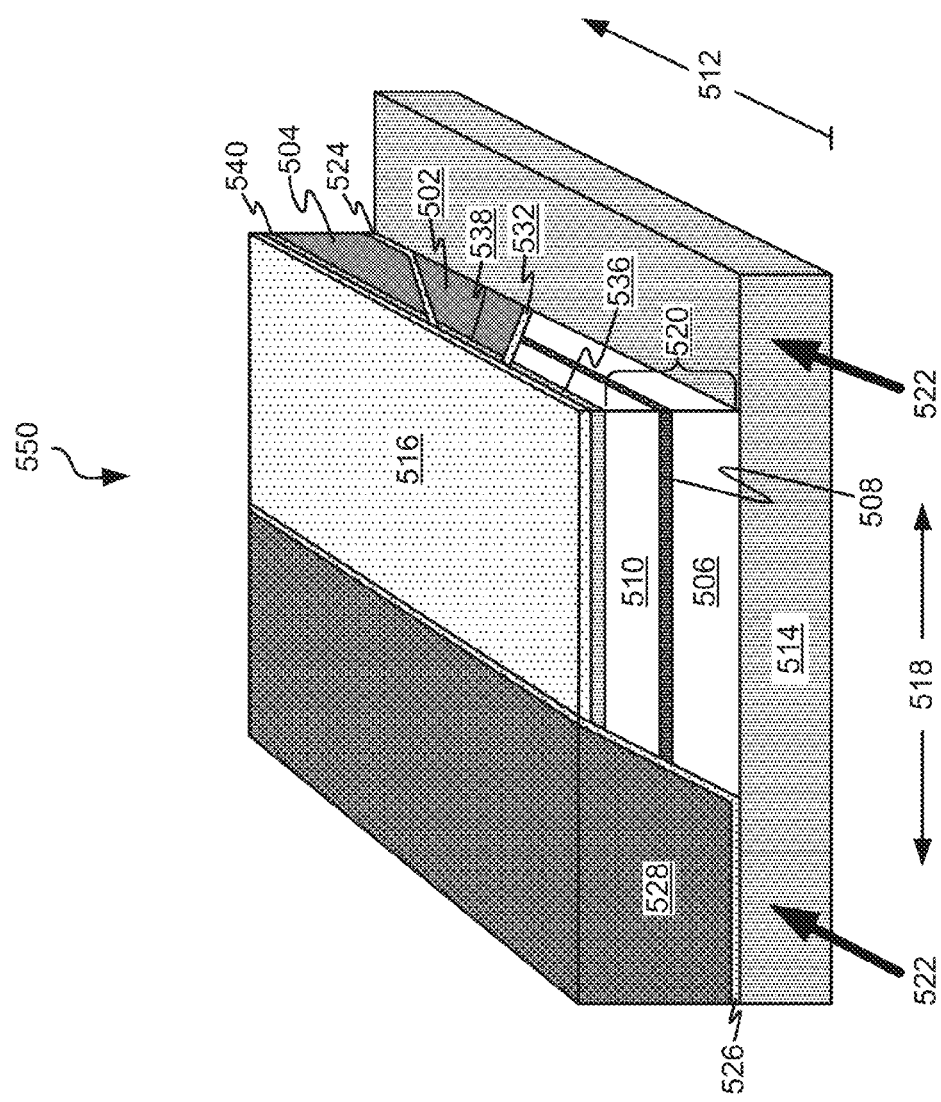
Figure 5C:
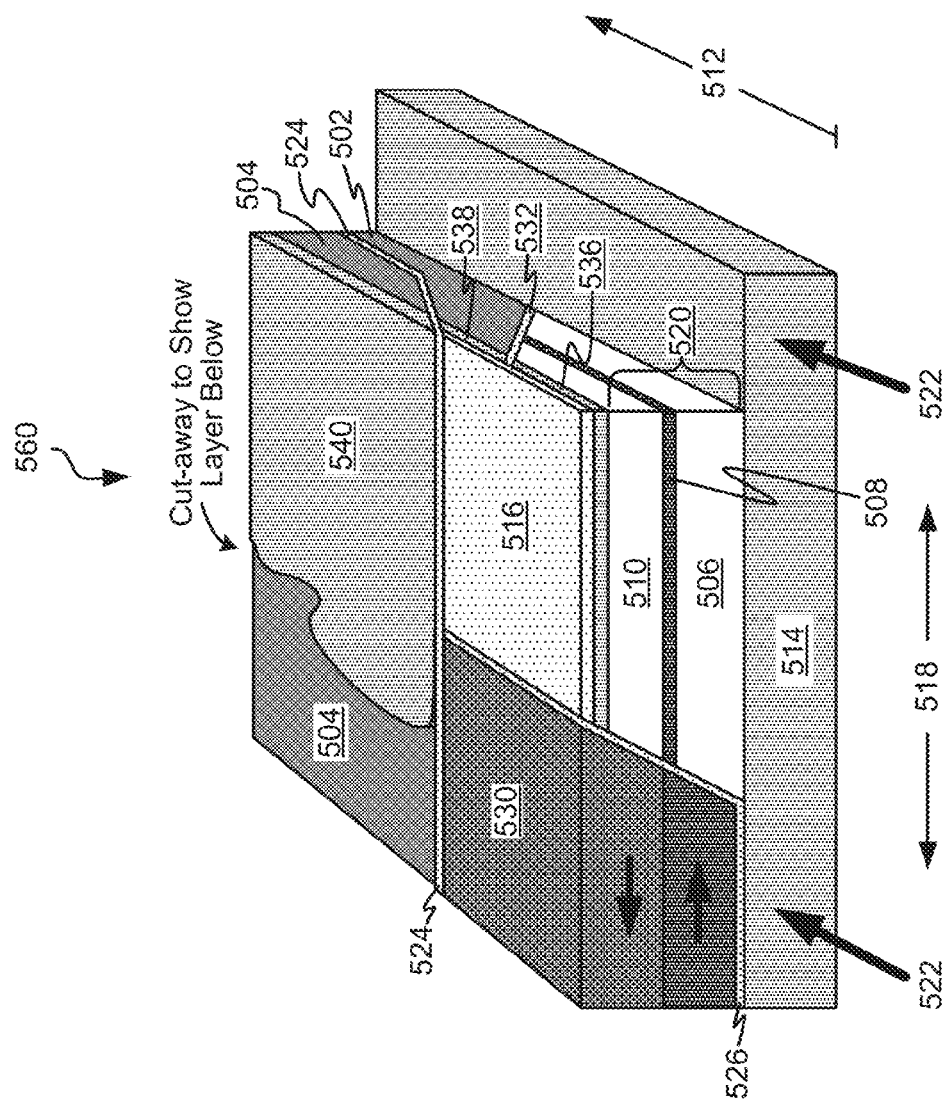
Figure 5D:
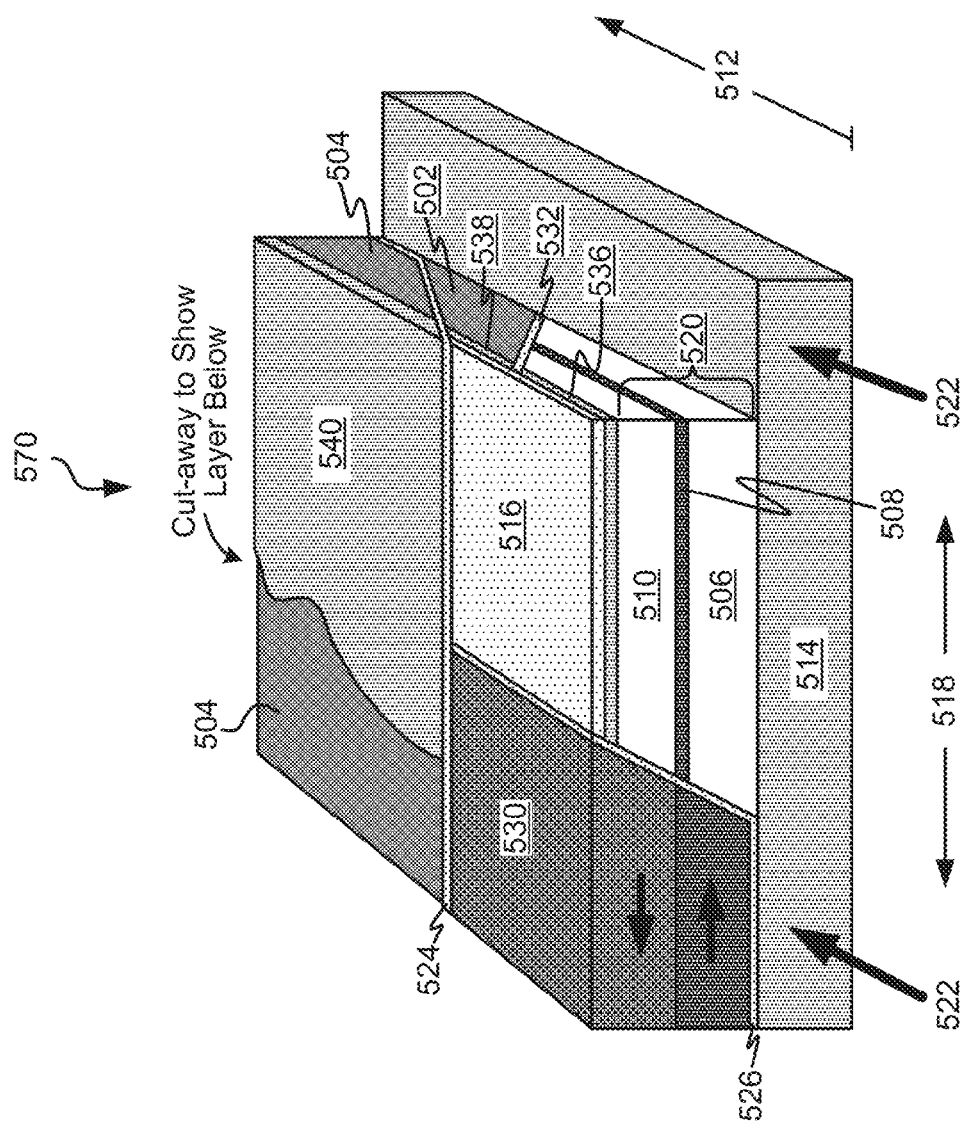

According to one embodiment, a scissor sensor may be formed with a soft bias layer positioned behind a scissor sensor stack in the element height direction. One such scissor sensor 500 is shown according to one embodiment in FIG. 5A. Other scissor sensors are shown in FIGS. 5B-5F according to more embodiments. FIGS. 5A and 5C are examples of scissor sensors where a hard bias layer is formed after a partial milling process has removed some of the material of an upper portion at the back edge of the soft bias layer 502. In contrast, FIGS. 5B and 5D are examples of scissor sensors where the hard bias layer is formed after a full milling process has removed substantially all of the material of the back edge of the soft bias layer 502, and possibly some of the material from the lower shield 514 positioned therebelow.

Referring now to FIGS. 5A-5D, partial views of scissor sensors are shown according to several embodiments. In these figures, the scissor sensor is shown in isometric cross-section, with only half of the track width of the scissor sensor being shown in each image. The design of a scissor sensor typically requires a 'bias' of flux perpendicular to the media-facing surface 522 plane of the sensor, and 'soft-bias' may be a preferred source of such bias. The ferromagnetism of a soft bias layer 502 is not influenced by grain microstructure, like a hard bias material, and therefore a uniformly biased population is achievable. Also, soft bias may be preferred because the magnetic moment of the soft bias layer 502 may be tuned much higher than material of a hard bias layer (up to about 2.4 T in some instances).

Shape anisotropy may be produced from defining the soft bias layer 502 after the stripe height is formed, according to one embodiment. However, such a shaped soft bias layer 502 is uniaxial, meaning two intrinsic micromagnetic states are stable. Only one of these possible states will produce a pulse of the polarity to which the drive may be expecting. Even though the soft bias may be set to the desired state during drive fabrication, operational stresses (i.e., disk contact, stray magnetic fields, the write process, etc.) may destabilize temporarily the magnetization and the soft bias will possibly return to the undesired stable state. Subsequent readback would have inverted pulse polarity, and cause data detection to fail. Therefore, it is desired to convert the uniaxial anisotropy to a unidirectional anisotropy (i.e., one stable state in the desired direction).

In all embodiments described herein, this may be accomplished with a hard bias layer 504 that may be positioned behind the soft bias layer 502 in the element height direction 512.

The scissor sensor stack 520 includes a first free layer (FL1) 506 positioned in front of the soft bias layer 502 in the element height direction 512, a second free layer (FL2) 510 positioned above the FL1 506 and in front of the soft bias layer 502 in the element height direction 512, and a barrier layer 508 positioned between the FL1 506 and the FL2 510. Additionally, in one embodiment, a seed layer (not shown) may be positioned below the FL1 506 in order to promote desired growth and magnetism in the FL1 506, as would be understood by one of skill in the art. Also, in one embodiment, a non-magnetic cap layer 536 may be positioned above the FL2 510 in order to protect the FL2 510 from damage that may occur during other formation and/or deposition processes that may take place after the formation of the sensor 520. The seed layer and cap layer 536 may comprise any suitable material known in the art.

In a further embodiment, a lower shield 514 may be positioned below the layers of the scissor sensor, and may be formed of any suitable conductive, soft ferromagnetic material known in the art, such as NiFe, CoFe, etc. Furthermore, the lower shield 514 may be formed using any suitable deposition technique known in the art, such as sputtering, atomic layer deposition (ALD), plating, etc. The lower shield 514 may be used to shield one or more components of the scissor sensor from unwanted magnetic interference in one approach. In another embodiment, the lower shield 514 may be used as an electrical contact (e.g., an electrode) to the scissor sensor for transmitting bias current to the scissor sensor and readback to the drive. Lower shield 514 thus has an electrical connection to the FL1 506 and electrical isolation from the rest of the structure above the lower shield 514.

The soft bias layer 502 is positioned behind the scissor sensor stack 520 in the element height direction 512, and may comprise any soft magnetic material known in the art, such as Ni, Fe, Co, and alloys thereof, among others.

In one embodiment, an insulating layer 532 may be positioned at least between the soft bias layer 502 and the scissor sensor stack 520, and may also be positioned below the soft bias layer 502 and the lower shield 514 positioned therebelow. This insulating layer 532 may be configured to electrically insulate the soft bias layer 502 from the FL1 506 and/or from the lower shield 514. The insulating layer 532 may comprise any suitable material known in the art, such as alumina, MgO, $Si_3N_4$, other dielectrics, etc.

At least a portion of the hard bias layer 504 may be positioned behind the soft bias layer 502 in the element height direction 512, and the hard bias layer 504 may comprise any ferromagnetically hard magnetic material known in the art (such as CoCr, CoPt, etc.) with a high magnetic coercivity in the plane of the film. The remnance-magnetization X thickness product of the hard bias layer 504 may be chosen to be on the order of that of the soft bias layer 502. Furthermore, the hard bias layer 504 may be given an initialization magnetization that is perpendicular to a media-facing surface 522 of the scissor sensor stack 520. The high in-plane coercivity of the hard bias will retain this magnetization throughout the lifetime of the drive. This combined ferromagnetic system (soft bias with hard bias) allows direct coupling of the hard bias remnant flux to the soft bias, thus making one of the previously stable soft bias states—(the state where soft bias and hard bias are opposed)—energetically unstable. When a stress distorts the soft bias, there is only one stable state for the soft bias to return to, the desired state. Thus, the hard bias layer 504 converts the soft bias uniaxial anisotropy to a single unidirectional anisotropy. The hard bias direction—into or out of the media-facing surface—may be predetermined by selecting the initialization direction that achieves the target pulse polarity of the detector.

Figure 5E:
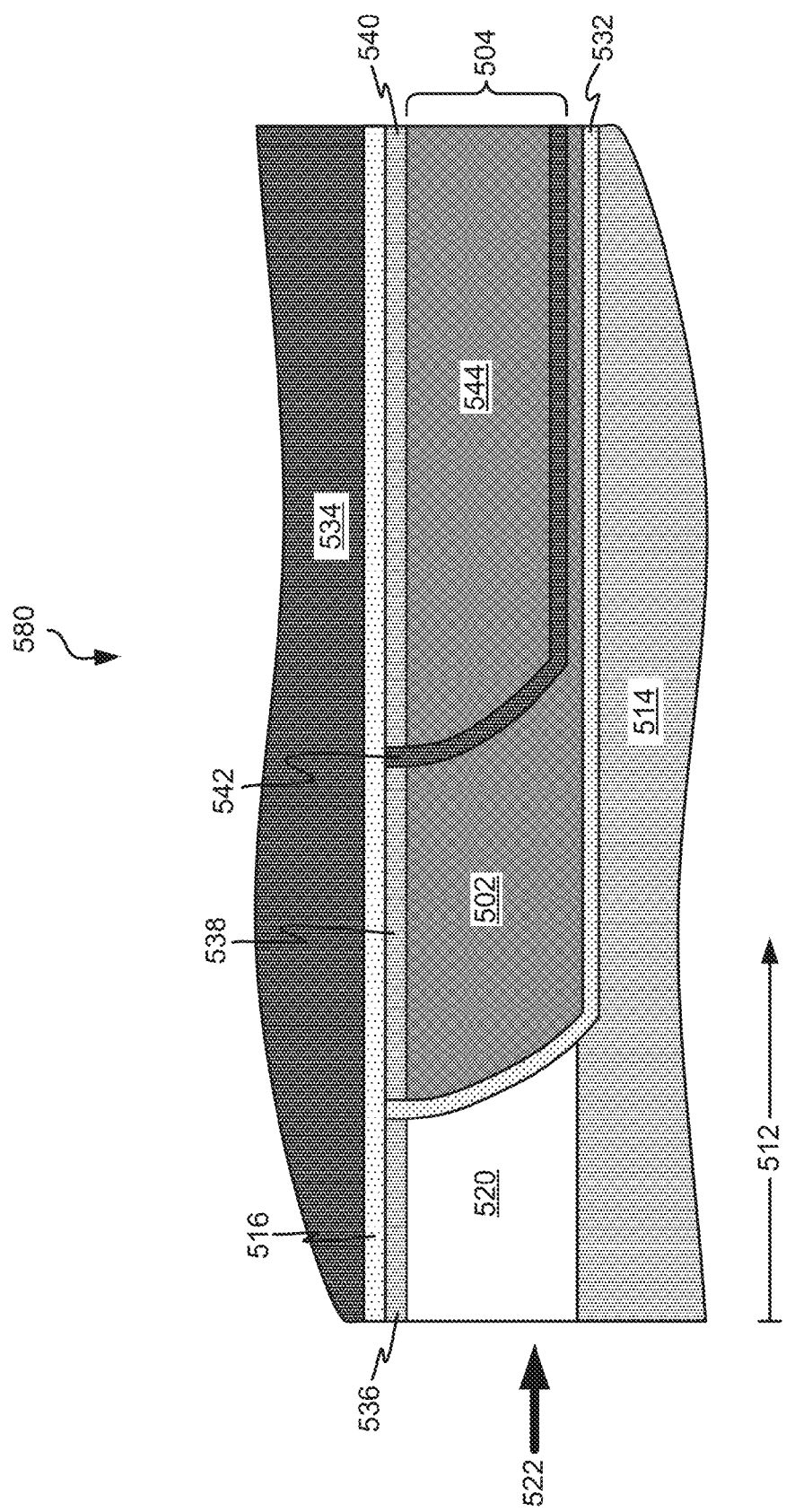
FIGS. 5E-5F show cross-sectional views of scissor sensors, according to two embodiments.
Figure 5F:
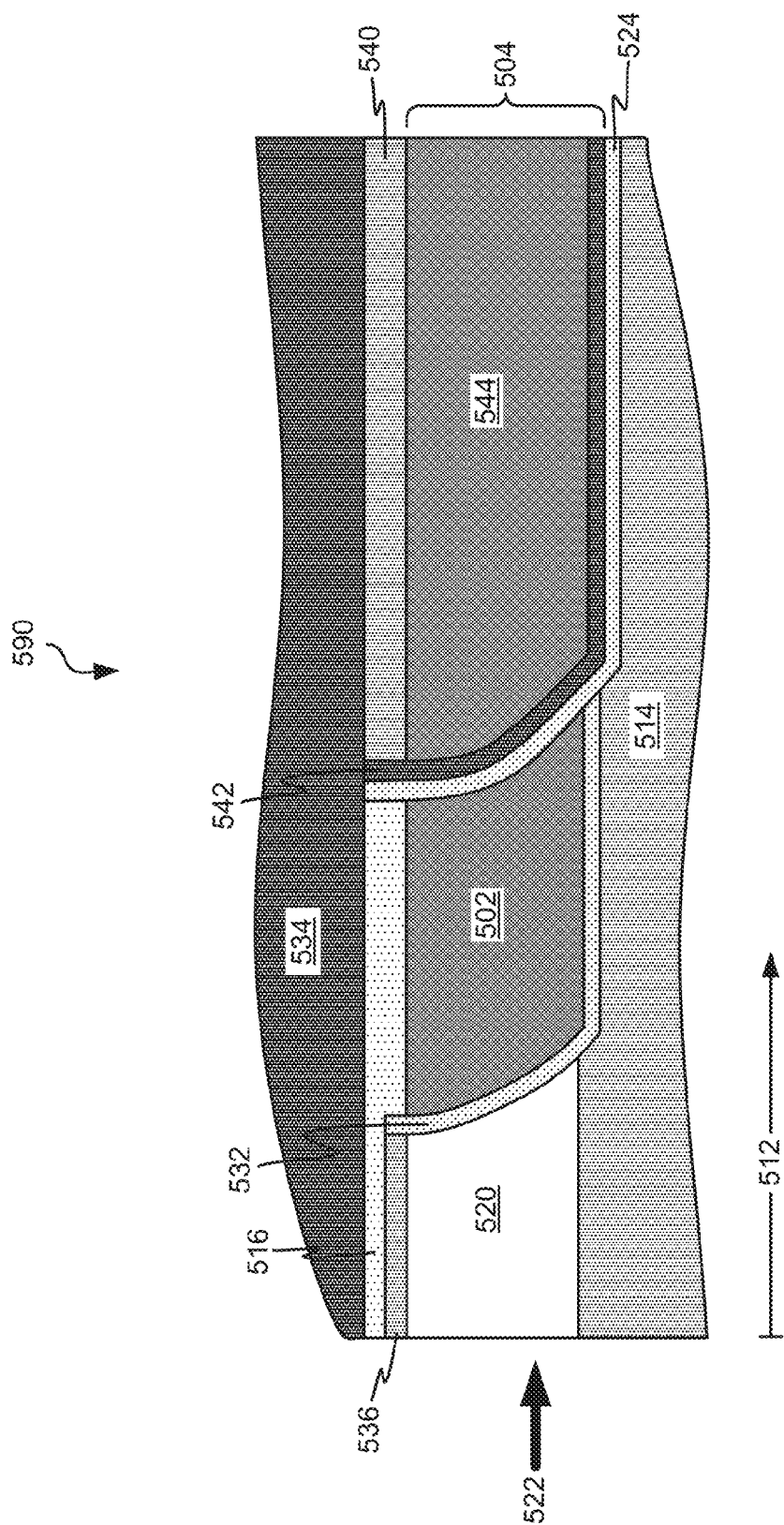

In one embodiment as shown in FIGS. 5E and 5F, a non-magnetic cap layer 536 may be positioned above the FL2 510 to protect the scissor sensor stack 520 from damage that may occur during other formation and/or deposition processes that may take place after formation of the scissor sensor stack 520 and to ferromagnetically isolate the FL2 510 from an upper shield which may be positioned above the scissor sensor stack 520. In another embodiment, as shown in FIG. 5E, an optional non-magnetic cap layer 538 may be positioned above the soft bias layer 502 to protect the soft bias layer 502 from damage that may occur during other formation and/or deposition processes that may take place after formation of the soft bias layer 502 and to ferromagnetically isolate the soft bias layer 502 from an upper shield which may be positioned thereabove. In yet another embodiment, as shown in FIGS. 5E and 5F, a non-magnetic cap layer 540 may also be positioned above the hard bias layer 504 to protect the hard bias layer 504 from damage that may occur during other formation and/or deposition processes that may take place after formation of the hard bias layer 504 and to ferromagnetically isolate the hard bias layer 504 from an upper shield which may be positioned thereabove.

According to yet another embodiment, as shown in FIGS. 5A-5F, a single, continuous or semi-continuous (possibly being interrupted by differences in height, insulating layers, etc.) non-magnetic cap layer 516 may be formed above any or all of the soft bias layer 502, the hard bias layer 504, and/or the scissor sensor stack 520.

The non-magnetic cap layers are configured to protect layers positioned therebelow from damage, corrosion, etc., and to ferromagnetically isolate the soft bias layer 502, the hard bias layer 504, and the scissor sensor stack 520, and may comprise any suitable material known in the art, such as Ru, among others.

As an example, in order to set the unidirectional state of the soft bias layer 502, an antiferromagnetic (AFM) layer (not shown) may be formed below (or above) the soft bias layer 502 in order to exchange couple to the soft bias layer 502 and provide an unidirectional state. However, AFMs for the soft bias layer 502 and lower shield 514 should be set in orthogonal directions, e.g., one must be a set at a lower temperature and be compromised on strength. The AFM exchange energy may be difficult to control because the AFM and the soft bias layer 502 are stitched in independent depositions. Even if the exchange energy of the AFM is strong, the effective field is weak because the moment of the soft bias layer 502 must be large enough to rotate each free layer 506, 510 by 45°.

Therefore, in embodiments described herein, a hard bias layer 504 is abutted to the back edge of the soft bias layer 502 and is set with an initialization magnet perpendicular to the media-facing surface 522 of the sensor.

Placement of the hard bias/soft bias edge may be recessed sufficiently from the media-facing surface 522 to allow the shape of the soft bias layer 502 to set the uniaxial direction of the soft bias layer 502 (shape anisotropy), while still being close enough to allow a single micromagnetic state which guarantees unidirectional operation.

This has the advantages of being easily and readily manufactured (hard bias processes have been developed over a 30 year period), and it converts the uniaxial anisotropy to a unidirectional anisotropy with the direction set by an external initialization which may be performed any time prior to drive build.

Also, any AFMs (i.e., in structures which utilize the lower shield 514 and/or an upper shield) are free to be set at high temperature because the scissor sensor 520, soft bias layer 502, and hard bias layer 504, do not include an AFM.

As shown in FIG. 5A, at least one portion of an upper surface of the hard bias layer 504 may be positioned closer to the media-facing surface 522 of the scissor sensor 500 than any portion of a lower surface of the hard bias layer 504. Furthermore, at least one portion of a lower surface of the soft bias layer 502 may be positioned closer to the media-facing surface 522 of the scissor sensor 500 than any portion of an upper surface of the soft bias layer 502. In other approaches, edges of the soft bias layer 502 and/or the hard bias layer 504 (and any intervening layers therebetween) may be oriented in a vertical direction substantially perpendicular to a plane of deposition of the soft and hard bias layers 502, 504.

The barrier layer 508 may comprise any suitable material known in the art, such as MgO, alumina, etc., and may be formed using any suitable deposition technique known in the art, such as sputtering, ALD, etc., and may be structured as a CPP-GMR, TMR, etc. During operation, a voltage difference is applied across this barrier. Operation is contingent on lack of low resistance parallel shunts which utilize the additional insulating layers (524, 532, and/or 526) outside the barrier region. This may be accomplished in one embodiment by having every metal layer electrically connected to the top of the barrier layer 508, electrically isolated from every other metal layer electrically connected to the bottom of the barrier layer 508.

The sensor track width may be defined using conventional photolithography and milling techniques and the track edges may be coated by a conventional insulating layer 526 to confine the current to the barrier. The sensor removed outside of the sensor region is replaced with other material 528 to planarize the wafer surface. This material may be just a continuation of the isolation insulating layer 526 material, a different dielectric, or a soft ferromagnetic material to form side shields. Choice of the track width side material 528 may take many forms, but is generally independent of the design of the hard bias layer 504.

Prior to deposition of the insulating layer 524 and the hard bias layer 504, the back region of soft bias layer 502 may be removed to allow auto-alignment of the hard bias layer 504 to the soft bias layer 502, as shown in FIGS. 5A-5D. This removal process may terminate 'early' leaving a thin remnant of soft bias layer 502 and all the insulating layer 532 as shown in FIG. 5E or terminate at (or in) the insulating layer 532. This design is referred to as partial mill (also shown in FIGS. 5A and 5C).

In another embodiment, the removal may clear all of the soft bias layer 502 and insulating layer 532 from a back edge thereof along with possibly some of the lower shield 514 as shown in FIG. 5F. This embodiment is referred to as full mill (also shown in FIGS. 5B and 5D). In the full mill case, insulating layer 524 is used to electrically isolate the hard bias layer 504 from the lower shield. 514. In the partial mill case, the insulating layer 524 is not necessary and may/may not be present, due to electrical isolation for the hard bias layer being provided by the presence of the soft bias layer 502 therebelow. Isolation is attained by the remaining insulating layer 532.

Also, as shown in FIG. 5E, in another embodiment, at least a portion of the hard bias layer 504 (which may comprise a seed layer 542 positioned below a ferromagnetic hard bias material layer 544, the seed layer 542 being configured to promote desired growth and magnetism in the hard bias material layer 544) may be in direct contact with a back edge of the soft bias layer 502 or significantly close thereto, separated by just a thin insulating layer, not shown. The seed layer 542 may comprise any suitable material known in the art. In these embodiments, a portion of the soft bias layer 502 may extend below the hard bias layer 504 in the element height direction 512. This portion of the soft bias layer 502 may be configured to electrically isolate the hard bias layer 504 from the lower shield 514 positioned therebelow.

In other embodiments, as shown in FIGS. 5E-5F, an upper shield 534 may be positioned above the scissor sensor stack 520, the upper shield 534 being electrically coupled to the hard bias layer 504, such as at a back edge thereof through a nonmagnetic cap layer 540 and/or 516. The upper shield 534 may be positioned above all the layers of the scissor sensor and may be formed of any suitable conductive, soft ferromagnetic material known in the art. The lower shield 514 and the upper shield 534 may be independently formed of any suitable material known in the art, such as NiFe, CoFe, etc., and may be formed using any suitable deposition technique known in the art, such as sputtering, ALD, plating, etc.

The upper shield 534 may electrically connect to any of the layers in the structure except the FL1 506 and the lower shield 514, and may connect directly or indirectly to the FL2 510. When these conditions and those described for the lower shield 514 are met, the bias current is committed to exclusively flow through the barrier layer 508, which is a desirable result.

Now referring to FIGS. 5A-5D and 5F, an insulating layer 524 may be positioned between the soft bias layer 502 and the hard bias layer 504. The insulating layer 524 may be configured to electrically isolate the soft bias layer 502 from the hard bias layer 504, and may comprise any suitable dielectric material known in the art, such as alumina, MgO, $Si_3N_4$, etc. Furthermore, the insulating layer 524 may also be positioned below the hard bias layer 504 in order to electrically isolate the hard bias layer 504 from the lower shield 514 positioned therebelow, in one approach.

As shown in FIGS. 5A-5D, the soft bias layer 502 may have a length in the element height direction 512 which is at least twice a width in a track width direction 518 to form shape anisotropy perpendicular to the media-facing surface 522 of the scissor sensor. Furthermore, the scissor sensor stack 520 may have a width in the track width direction 518 that is substantially equal to the width of the soft bias layer 502 in the track width direction 518, or more or less in certain other embodiments.

Again referring to FIGS. 5A-5D, the fabrication of the hard bias layer 504 may occur before definition of the track width (as shown in FIGS. 5A and 5B). In another embodiment, the deposition may occur after definition of the track width (as shown in FIGS. 5C and 5D). In either case, the soft bias layer 502 may be abutted to the back edge of the sensor stack 520 prior to the track width definition and hard bias fabrication, in preferred embodiments. In all cases, sensor track width processing sets: 1) the soft bias track width, 2) a very small soft bias width in the track width direction, and 3) a soft bias layer 502 that is auto-aligned to the sensor stack 520.

For the embodiment in FIGS. 5A-5B, the hard bias process may be performed prior to the sensor track width process and thus also sets: 1) the sensor track width in track width direction 518, 2) a very small hard bias width in the track width direction 518, and 3) a hard bias layer 504 that is auto-aligned to the soft bias layer 502.

In one embodiment, as shown in FIGS. 5A-5B, an insulating and/or shielding layer 528 may be positioned on one or more sides of the scissor sensor stack 520 in the track width direction 518. The insulating and/or shielding layer 528 may be non-magnetic, non-conductive, magnetic, conductive, or possess any other desired property in order to provide a desired effect on at least one other layer or component of the scissor sensor. In several embodiments, the insulating and/or shielding layer 528 may comprise any suitable material known in the art, such as CoFe, NiFe, CoCrPt, alumina, MgO, $Ta_2O_5$, Ru, etc. Furthermore, another insulating or spacer layer 526 may be formed between the insulating and/or shielding layer 528 and the scissor sensor stack 520, and/or between the insulating and/or shielding layer 528 and the lower shield 514.

In another embodiment, as shown in FIGS. 5C-5D, a side shield 530 may be positioned on one or more sides of the scissor sensor stack 520 in the track width direction 518. The side shield 530 may comprise any suitable material known in the art, such as NiFe, CoFe, etc. Furthermore, an insulating or spacer layer 526 may be formed between the side shield 530 and the scissor sensor stack 520 and/or between the insulating and/or shielding layer 530 and the lower shield 514. The side shield 530 may be configured to further enhance the scissor magnetization of the two free layers 506, 510, as shown by the antiparallel magnetism of the side shield layers to one another, which is indicated by the arrows pointing opposite to each other.

With continued reference to FIGS. 5C-5D, at least a portion of the hard bias layer 504 may extend beyond sides of the scissor sensor stack 520 and the soft bias layer 502 in the track width direction 518. This orientation may be due to the track width being defined prior to formation of the hard bias layer 504, which leaves the hard bias layer 504 where it is initially deposited abutting the back edge of the soft bias layer 502.

With reference to FIG. 5E, a cross-sectional view of a scissor sensor 580 is shown where the hard bias layer 504 may be formed after a partial milling procedure on the soft bias layer 502. The scissor sensor 580 is shown with a single cap layer 516 that is positioned above the entire structure and with multiple cap layers 536, 538, and 540, individually positioned above the scissor sensor stack 520, the soft bias layer 502, and the hard bias layer 504, respectively, and below an upper shield 534. It is noted that in this configuration, the insulating layer 532 may or may not covered by any of the cap layers. This may be an aspect of any of the embodiments shown herein.

Furthermore, the hard bias layer 504 is shown as a seed layer 542 on which a ferromagnetic hard bias material layer 544 is formed (in addition, the non-magnetic cap layer 540 may be included in the definition of the hard bias layer 504). The design of this type of structure is well known to anyone skilled in the art and has been used as a bias structure for conventional CIP-AMR, CIP-GMR, TMR, and CPP-GMR for about 30 years. Many different materials for all three layers have been developed and are easily deployed through a number of deposition/patterning techniques. However, in one specific embodiment, the hard bias layer 504 may be used to stabilize the soft bias 502 as opposed to biasing the sensor stack 520. The hard bias layer 504 may have sufficient flux and proximity to the soft bias layer 502 to make the magnetic flux density approximately continuous from the ferromagnetic layer 544 to the soft bias layer 502. Population variation of the hard bias flux due to finite grain size is not significant since it is only stabilizing the soft bias (in the soft bias layer 502)—a binary operation. Sensor bias variation is controlled by the soft bias layer 502 flux across the soft bias layer 502 to the sensor stack 520 interface.

The seed layer 542 may be used to initiate the crystal growth of the ferromagnetic layer 544 thereabove, which ultimately determines its ferromagnetic properties (hard bias). It may comprise any suitable material such as NiTa, CrMo, Ti, W, etc. It may be deposited by any known technique, such as sputtering, IBD, etc., and may preferably be deposited without breaking vacuum with the other two layers 544 and 540.

The ferromagnetic layer 544 may have a high in-plane coercivity and a remnant moment such that the flux after initialization transferred from the ferromagnetic layer 544 to the soft bias layer 502 is approximately matched. The ferromagnetic layer 544 may comprise any suitable material such as CoP, CoPt, etc. It may be deposited by any known technique, such as plating, sputtering, IBD, etc., and may preferably be deposited without breaking vacuum with the other two layers 540 and 542.

The cap layer 540 may be a nonmagnetic material used to protect the surface of the ferromagnetic layer 544 from post processing and to exchange isolate it from the upper shield 534 in the event the upper shield 534 does not have its own exchange break as a first layer. It may comprise any suitable nonmagnetic material such as Ru, Ta, Cr, etc. it may be deposited by any known technique such as plating, sputtering, IBD, etc., and it is preferable to deposit the layer without breaking vacuum with the other two layers 540 and 544.

In the case of the partial mill (in FIG. 5E), no dielectric is required under the hard bias layer 504. The upper shield 534 will remain electrically isolated from the lower shield 514 due to the insulating layer 532.

In another embodiment, as shown in FIG. 5F, a cross-sectional view of a scissor sensor 590 is shown where the hard bias layer 504 may be formed after a full milling procedure on the soft bias layer 502. The scissor sensor stack 520 is shown with its own non-magnetic cap layer 536, along with a continuous cap layer 516 that is positioned above the scissor sensor stack 520 and the soft bias layer 502, along with the end of the insulating layer 532. Also, a hard bias cap layer 540 is positioned above the hard bias layer 504. This may be an aspect of any of the embodiments shown herein. In the case of the full mill (in FIG. 5F), removal of the insulating layer 532 under the hard bias region dictates replacement of the insulation that is removed, and therefore the insulating layer 524 may be used to achieve isolation.

Various different cap layer arrangements, insulating layer arrangements, and nonmagnetic metallic spacer layer orientations are possible in addition to those specifically described in FIG. 5A-5F, as would be understood by one of skill in the art.

In one embodiment, the various scissor sensors 500, 550, 560, 570, 580, and 590 shown in FIGS. 5A, 5B, 5C, 5D, 5E, and 5F, respectively, may be incorporated in a magnetic head for reading data from a magnetic medium.

Now referring to FIG. 6A-6G, a method for forming a scissor sensor is shown using a top view and cross-sectional view of a structure during various stages of a formation process, according to one embodiment. The formation process may utilize a partial mill in order to form the scissor sensor. As shown in FIG. 6A, a sensor stack 604 is formed above a lower shield 602 full film, with an insulating material 606 being formed below the lower shield 602. The sensor stack 604 may comprise a FL1 604a, a barrier layer 604b, and a FL2 604c, formed near a to-be-formed media-facing surface 612, according to one embodiment.

In FIG. 6B, a portion of the sensor stack 604 is milled or otherwise removed, and a soft bias layer 608 is formed in the milled away portion away from the to-be-formed media-facing surface 612 of the sensor stack 604 in an element height direction 610. An insulation layer 622 is disposed prior to forming the soft bias layer 608. The insulation layer 622 may comprise any suitable insulating material known in the art, such as alumina, SiN, MgO, etc. The insulation layer 622 is also disposed between the soft bias layer 608 and the sensor stack 604.

In FIG. 6C, a portion of the soft bias layer 608 is milled or otherwise removed, and an insulation layer 628 followed by a hard bias layer 614 are formed in the milled down portion behind the front end of the soft bias layer 608 in the element height direction 610. As shown, at least one portion of an upper surface of the hard bias layer 614 may be positioned closer to the media-facing surface 612 than any portion of a lower surface of the hard bias layer 614. Furthermore, at least one portion of a lower surface of the soft bias layer 608 may be positioned farther from the media-facing surface 612 than any portion of an upper surface of the soft bias layer 608.

In various embodiments, the insulation layer 628 may comprise any suitable insulating material known in the art, such as alumina, SiN, MgO, etc.

Furthermore, the soft bias layer 608 may extend below the hard bias layer 614 to electrically isolate the hard bias layer 614 from the lower shield 602 therebelow, as shown by the orientation of the soft bias layer 502 and the hard bias layer 504 in FIGS. 5A and 5C. Or, as shown in FIGS. 5B and 5D, the soft bias layer 502 and insulating layer 532 may be removed from a back edge thereof, along with possibly some of the lower shield 514, as shown in FIG. 5F. In this case, insulating layer 524 is used to electrically isolate the hard bias layer 504 from the lower shield 514. Moreover, the hard bias layer 504 may have a seed layer 542, such as CrMo, NiTa, etc., to grow the hard bias material layer 538, such as CoPt, CoPtCr, etc., for the structures shown in FIGS. 5A-5F.

Referring again to FIG. 6C, after formation of the hard bias layer 614, a nonmagnetic metallic spacer layer 620 is formed full film above the structure, and then partially removed, such as using resist and liftoff techniques known in the art, so that it remains only above the sensor stack 604, the soft bias layer 608, and the hard bias layer 614. The nonmagnetic metallic spacer layer 620 may comprise any suitable material known in the art, such as Ru, Ir, etc. The nonmagnetic metallic spacer layer 620 is configured to decouple the sensor stack 604, the soft bias layer 608, and the hard bias layer 614 from a subsequently formed top shield.

In FIG. 6D, a track width is defined at and near the media-facing surface 612, with a flare being preserved higher along the throat height. The track width may be defined using any process known in the art, such as milling, etching, etc., and in one embodiment, a mask or some other suitable layer may be used to form the track width of the structure. The portions of the structure which are not covered with the nonmagnetic metallic spacer layer 620 may have an insulation layer 624 deposited thereon. The insulation layer 624 may comprise any suitable material known in the art, such as alumina, MgO, SiN, etc.

In FIG. 6E, a side shield 616 is formed on both sides of the sensor stack 604 and thereabove at the media-facing surface 612. The side shield 616 may comprise any suitable material known in the art, and may be formed on one or both sides of the sensor stack 604.

In FIG. 6F, an insulating layer 618 is formed full film above the structure, while revealing portions of the nonmagnetic metallic spacer layer 620 above the sensor stack 604, the hard bias layer 614, and the soft bias layer 608 and planarizing the structure (including the insulating layer 618 and the side shield 616) to level the side shield 616 to the thickness of the nonmagnetic metallic spacer layer 620, thereby removing the side shield 616 from above the structure along the track width. By full film, what is meant is that the layer is formed above the entirety of the existing structure in a desired thickness. The planarizing may be performed using any technique known in the art, including chemical-mechanical polishing (CMP), among others. The insulating layer 618 may be formed in order to electrically isolate the sensor stack 604 from other layers. Any suitable material may be used for the insulating layer 618 as known in the art.

In FIG. 6G, a top shield 626 is formed above the structure which electrically and magnetically couples to the side shield 616. Also, the media-facing surface 612 is defined, thereby producing a scissor sensor according to one embodiment, having a soft/hard bias that influences the scissor sensor stack to provide better performance.

Other variations of the procedures and/or techniques shown in FIGS. 6A-6G are possible, according to various embodiments.

Now referring to FIG. 7A-7G, a method for forming a scissor sensor is shown using a top view and cross-sectional view of a structure during various stages of a formation process, according to one embodiment. The formation process may utilize a full mill in order to form the scissor sensor.

As shown in FIG. 7A, a sensor stack 704 is formed above a lower shield 702, with an insulating material 706 being formed below the lower shield 702. The sensor stack 704 may comprise a FL1, a barrier layer, and a FL2, according to one embodiment, which are formed at a to-be-formed media-facing surface 712. Also, a portion of the sensor stack 704 is milled or otherwise removed, and an insulation layer 722 and a soft bias layer 708 are formed in the milled away portion away from the to-be-formed media-facing surface 712 of the sensor stack 704 in an element height direction 710. The insulation layer 722 is disposed prior to forming the soft bias layer 708, and may comprise any suitable material known in the art, such as alumina, SiN, MgO, etc.

As shown in FIG. 7B, a nonmagnetic metallic spacer layer 720 is formed full film above the structure. The nonmagnetic metallic spacer layer 720 may comprise any suitable material known in the art, such as Ru, Ir, etc. The nonmagnetic metallic spacer layer 720 is configured to decouple the sensor stack 704 and the soft bias layer 708 from a subsequently formed top shield.

In FIG. 7C, a track width is defined at and near the media-facing surface 712, with a flare being preserved higher along the throat height. The track width may be defined using any process known in the art, such as milling, etching, etc., and a mask layer or some other suitable layer may be used to define the track width. After formation of the track width, an insulation layer 724 remains along sides of the track width structure which has the nonmagnetic metallic spacer layer 720 thereabove.

Also, an insulating layer 724 is formed full film above the structure, while revealing portions of the nonmagnetic metallic spacer layer 720 above the sensor stack 704. The insulating layer 724 may be formed in order to electrically isolate the sensor stack 704 from other layers. Any suitable material may be used for the insulating layer 724 as known in the art.

In FIG. 7D, a side shield 716 is formed above and near to the sensor stack 704 at the media-facing surface 712. The side shield 716 may comprise any suitable material known in the art, and may be formed on one or both sides of the sensor stack 704 along with above the sensor stack 704. The shape of the side shield 716 is configured to provide shielding on sides of the sensor when in use.

In FIG. 7E, a portion of the nonmagnetic metallic spacer layer 720 and the soft bias layer 708 are milled or otherwise removed, but not all of the soft bias layer 708. Also, an insulating layer 718 may be formed full film above the structure, while revealing portions of the nonmagnetic metallic spacer layer 720 above the sensor stack 704 and above the soft bias layer 708, and revealing portions of the soft bias layer 708 that has been removed and planarizing the structure (including the insulating layer 718 and the side shield 716) to the thickness of the nonmagnetic metallic spacer layer 720, thereby removing the side shield 716 from above the structure along the track width. The planarizing may be performed using any technique known in the art, including CMP, among others. Any suitable material may be used for the insulating layer 718 as known in the art.

In FIG. 7F, a hard bias layer 714 is formed in the milled down portion behind the front end of the soft bias layer 708 in the element height direction 710 and a hard bias cap layer 728 is formed above the hard bias layer 714 to provide isolation to the hard bias layer 714 from a subsequently formed top shield.

In another embodiment (as shown in FIGS. 6A-6G), an insulating layer not shown) may be formed between the hard bias layer 714 and both of the insulating layer 722 and the soft bias layer 708, the additional insulating layer comprising any suitable dielectric known in the art, such as alumina, that may be positioned to electrically isolate the hard bias layer 714 from the lower shield 702. This embodiment is used when the soft bias layer 708 is completely removed below the hard bias layer 714.

As shown in FIG. 7F, at least one portion of an upper surface of the hard bias layer 714 may be positioned closer to the media-facing surface 712 than any portion of a lower surface of the hard bias layer 714. Furthermore, at least one portion of a lower surface of the soft bias layer 708 may be positioned farther from the media-facing surface 712 than any portion of an upper surface of the soft bias layer 708.

In another embodiment, the additional insulating layer may extend between the soft bias layer 708 and the hard bias layer 714 to separate the layers.

In FIG. 7G, a top shield 726 is formed above the structure which electrically couples to the side shield 716. Also, the media-facing surface 712 is defined, thereby producing a scissor sensor according to one embodiment, having a soft/hard bias that influences the scissor sensor stack to provide better performance.

Other variations of the procedures and/or techniques shown in FIGS. 7A-7G are possible, according to various embodiments.

Figure 8:
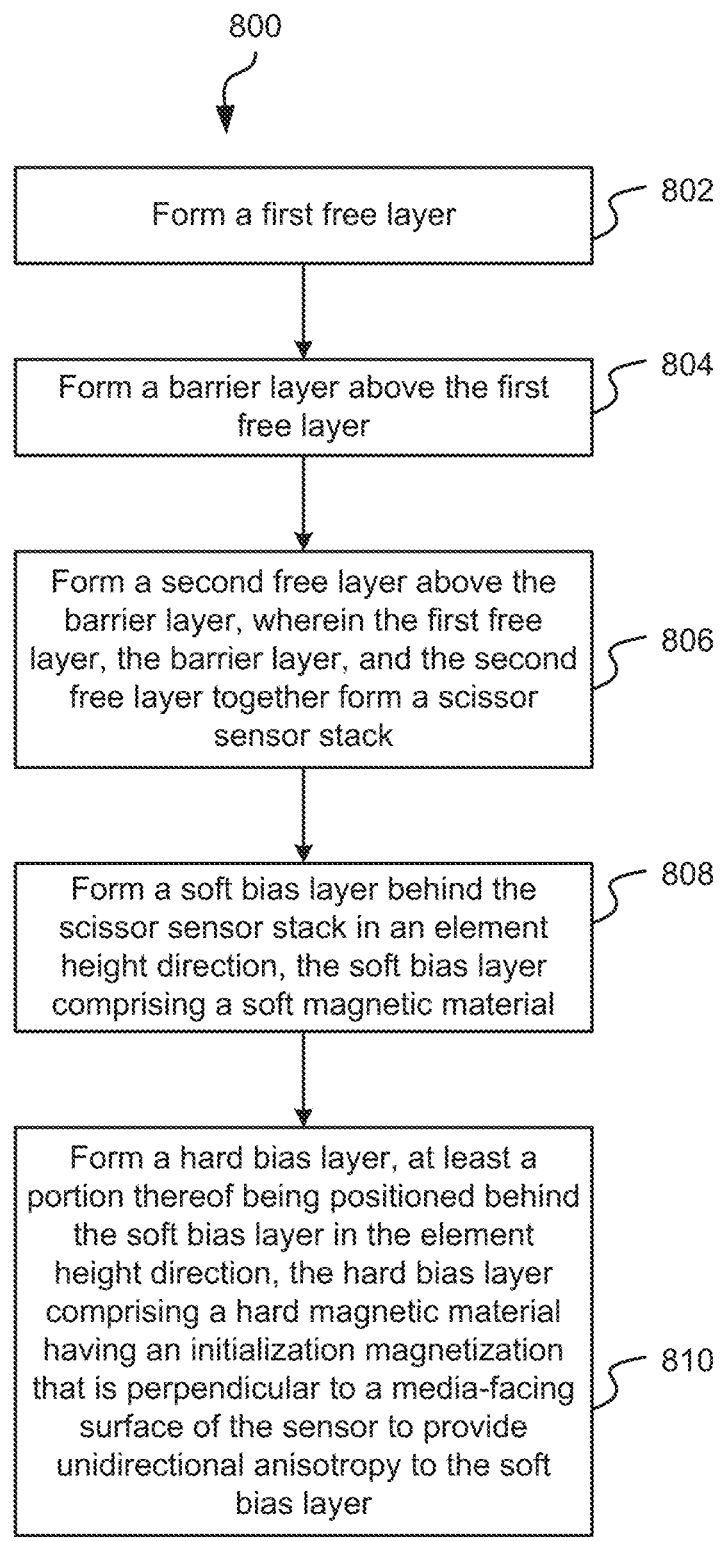
FIG. 8 shows a flowchart of a method according to one embodiment.

FIG. 8 shows a method 800 for forming a scissor sensor, such as for use in a magnetic head, in accordance with one embodiment. As an option, the present method 800 may be implemented to construct structures such as those shown in FIGS. 1-7G. Of course, however, this method 800 and others presented herein may be used to form magnetic structures for a wide variety of devices and/or purposes which may or may not be related to magnetic recording. Further, the methods presented herein may be carried out in any desired environment. It should also be noted that any aforementioned features may be used in any of the embodiments described in accordance with the various methods.

In operation 802, a first free layer is formed using any formation process known in the art, such as ALD, sputtering, plating, etc. Furthermore, the first free layer may comprise any suitable material known in the art, such as CoFe, NiFe, alloys thereof, etc.

In operation 804, a barrier layer is formed above the first free layer using any formation process known in the art, such as ALD, sputtering, plating, etc. Furthermore, the barrier layer may comprise MgO and/or some other suitable material known in the art.

In operation 806, a second free layer is formed above the barrier layer using any formation process known in the art, such as ALD, sputtering, plating, etc. Furthermore, the second free layer may comprise any suitable material known in the art, such as CoFe, NiFe, alloys thereof, etc. The first free layer, the barrier layer, and the second free layer together form a scissor sensor stack.

In operation 808, a soft bias layer is formed behind the scissor sensor stack in an element height direction, the soft bias layer comprising a soft magnetic material as known in the art, such as CoFe, NiFe, etc.

In operation 810, a hard bias layer is formed using any technique known in the art. At least a portion of the hard bias layer is positioned behind the soft bias layer in the element height direction, and the hard bias layer may comprise a hard magnetic material having an initialization magnetization that is perpendicular to a media-facing surface of the sensor to provide unidirectional anisotropy to the soft bias layer.

The method 800 may further include forming an upper shield above the scissor sensor stack, the upper shield being electrically coupled to the hard bias layer, and forming a lower shield below the sensor stack, the lower shield being electrically isolated from the hard bias layer. In this embodiment, at least one portion of an upper surface of the hard bias layer may be positioned closer to the media-facing surface of the sensor than any portion of a lower surface of the hard bias layer. In another embodiment, at least one portion of a lower surface of the soft bias layer is positioned closer to the media-facing surface of the sensor than any portion of an upper surface of the soft bias layer.

In another embodiment, at least a portion of the hard bias layer may be in direct contact with a back edge of the soft bias layer. In addition, a portion of the soft bias layer may extend below the hard bias layer in the element height direction and may be configured to electrically isolate the hard bias layer from the lower shield.

According to another embodiment, the method 800 may include forming an insulating layer between the soft bias layer and the hard bias layer and between the hard bias layer and the lower shield, the insulating layer being configured to electrically isolate the soft bias layer from the hard bias layer and the hard bias layer from the lower shield. Any technique may be used to form the insulating layer, and it may comprise any suitable material known in the art, such as alumina, MgO, etc.

In another embodiment, the soft bias layer may have a length in the element height direction which is at least twice a width in a track width direction to form shape anisotropy perpendicular to the media-facing surface of the sensor. Furthermore, the scissor sensor stack may have a width in the track width direction that is substantially equal to the width of the soft bias layer in the track width direction. That is to say, the width of the soft bias layer may be about equal to the width of the scissor sensor stack.

In another embodiment, the method 800 may include a side shield on one or more sides of the scissor sensor stack in the track width direction. Furthermore, a top shield may be formed above the scissor sensor stack, in another embodiment.

In yet another embodiment, at least a portion of the hard bias layer may extend beyond sides of the scissor sensor stack and the soft bias layer in a track width direction.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
   a scissor sensor stack, comprising:
      a first free layer;
      a second free layer positioned above the first free layer; and
      a barrier layer positioned between the first free layer and the second free layer;
   a soft bias layer positioned behind the scissor sensor stack in an element height direction, the soft bias layer comprising a soft magnetic material; and
   a hard bias layer, at least a portion thereof being positioned behind the soft bias layer in the element height direction, the hard bias layer comprising a hard magnetic material having an initialization magnetization that is perpendicular to a media-facing surface of the apparatus to provide unidirectional anisotropy to the soft bias layer,
   wherein at least one portion of an upper surface of the hard bias layer is positioned closer to the media-facing surface of the apparatus than any portion of a lower surface of the hard bias layer, and wherein at least one portion of a lower surface of the soft bias layer is positioned farther from the media-facing surface of the apparatus than any portion of an upper surface of the soft bias layer.

2. The apparatus as recited in claim 1, wherein the scissor sensor stack further comprises a cap layer positioned above the second free layer.

3. The apparatus as recited in claim 1, further comprising a lower shield positioned below at least the scissor sensor stack in a thickness direction, the lower shield being electrically isolated from the hard bias layer.

4. The apparatus as recited in claim 1, wherein at least a portion of the hard bias layer is in direct contact with a back edge of the soft bias layer.

5. The apparatus as recited in claim 1, further comprising an upper shield positioned above the scissor sensor stack, the upper shield being electrically coupled to and exchange isolated from the hard bias layer.

6. The apparatus as recited in claim 1, further comprising an insulating layer positioned between the soft bias layer and the hard bias layer, the insulating layer being configured to electrically isolate the soft bias layer from the hard bias layer.

7. The apparatus as recited in claim 6, wherein the insulating layer is further positioned below the hard bias layer and is configured to electrically isolate the hard bias layer from a lower shield positioned therebelow.

8. The apparatus as recited in claim 1, wherein the soft bias layer has a length in the element height direction which is at least twice a width in a track width direction to form shape anisotropy perpendicular to the media-facing surface of the apparatus.

9. The apparatus as recited in claim 8, wherein the scissor sensor stack has a width in the track width direction that is substantially equal to the width of the soft bias layer in the track width direction.

10. The apparatus as recited in claim 1, further comprising a side shield positioned on one or more sides of the scissor sensor stack in a track width direction.

11. A magnetic data storage system, comprising:
   at least one magnetic head comprising the apparatus as recited in claim 1;
   a magnetic medium;
   a drive mechanism for passing the magnetic medium over the at least one magnetic head; and
   a controller electrically coupled to the at least one magnetic head for controlling operation of the at least one magnetic head.

12. An apparatus, comprising:
   a scissor sensor stack, comprising:
      a first free layer;
      a second free layer positioned above the first free layer; and
      a barrier layer positioned between the first free layer and the second free layer;
   a soft bias layer positioned behind the scissor sensor stack in an element height direction, the soft bias layer comprising a soft magnetic material; and
   a hard bias layer, at least a portion thereof being positioned behind the soft bias layer in the element height direction, the hard bias layer comprising a hard magnetic material having an initialization magnetization that is perpendicular to a media-facing surface of the apparatus to provide unidirectional anisotropy to the soft bias layer,
   wherein at least a portion of the hard bias layer is in direct contact with a back edge of the soft bias layer, and
   wherein a portion of the soft bias layer extends below the hard bias layer in the element height direction and is configured to electrically isolate the hard bias layer from a lower shield positioned therebelow.

13. A magnetic data storage system, comprising:
   at least one magnetic head comprising the apparatus as recited in claim 12;
   a magnetic medium;
   a drive mechanism for passing the magnetic medium over the at least one magnetic head; and
   a controller electrically coupled to the at least one magnetic head for controlling operation of the at least one magnetic head.

14. The apparatus as recited in claim 12, further comprising a side shield positioned on one or more sides of the scissor sensor stack in a track width direction.

15. The apparatus as recited in claim 12, further comprising an upper shield positioned above the scissor sensor stack, the upper shield being electrically coupled to and exchange isolated from the hard bias layer.

16. An apparatus, comprising:
   a scissor sensor stack, comprising:
      a first free layer;
      a second free layer positioned above the first free layer; and
      a barrier layer positioned between the first free layer and the second free layer;
   a soft bias layer positioned behind the scissor sensor stack in an element height direction, the soft bias layer comprising a soft magnetic material; and
   a hard bias layer, at least a portion thereof being positioned behind the soft bias layer in the element height direction, the hard bias layer comprising a hard magnetic material having an initialization magnetization that is perpendicular to a media-facing surface of the apparatus to provide unidirectional anisotropy to the soft bias layer, wherein at least a portion of the hard bias layer extends beyond sides of the scissor sensor stack and the soft bias layer in a track width direction.

17. A magnetic data storage system, comprising:
at least one magnetic head comprising the apparatus as recited in claim 16;
a magnetic medium;
a drive mechanism for passing the magnetic medium over the at least one magnetic head; and
a controller electrically coupled to the at least one magnetic head for controlling operation of the at least one magnetic head.

18. The apparatus as recited in claim 16, further comprising a side shield positioned on one or more sides of the scissor sensor stack in a track width direction.

19. The apparatus as recited in claim 1, further comprising an insulating layer positioned between the soft bias layer and the hard bias layer, the insulating layer being configured to electrically isolate the soft bias layer from the hard bias layer.

20. The apparatus as recited in claim 19, wherein the insulating layer is further positioned below the hard bias layer and is configured to electrically isolate the hard bias layer from a lower shield positioned therebelow.

* * * * *